United States Patent
Zhang

(10) Patent No.: US 10,183,688 B2
(45) Date of Patent: Jan. 22, 2019

(54) ADJUSTMENT LEVER ASSEMBLY, AND POSITION ADJUSTMENT DEVICE FOR STEERING WHEEL

(71) Applicant: NSK LTD., Tokyo (JP)

(72) Inventor: Zhiye Zhang, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/753,744

(22) PCT Filed: Sep. 30, 2016

(86) PCT No.: PCT/JP2016/079162
§ 371 (c)(1),
(2) Date: Feb. 20, 2018

(87) PCT Pub. No.: WO2017/057754
PCT Pub. Date: Apr. 6, 2017

(65) Prior Publication Data
US 2018/0297624 A1   Oct. 18, 2018

(30) Foreign Application Priority Data
Oct. 2, 2015   (JP) .................................. 2015-197151

(51) Int. Cl.
*B62D 1/184*   (2006.01)
*B62D 1/189*   (2006.01)

(52) U.S. Cl.
CPC .............. *B62D 1/184* (2013.01); *B62D 1/189* (2013.01)

(58) Field of Classification Search
CPC .......... B62D 1/18; B62D 1/184; B62D 1/185; B62D 1/187; B62D 1/189
(Continued)

(56) References Cited

U.S. PATENT DOCUMENTS

| 6,860,669 B2 | 3/2005 | Laisement et al. |
| 2006/0243084 A1 | 11/2006 | Osawa et al. |

(Continued)

FOREIGN PATENT DOCUMENTS

| DE | 10141551 A1 | 3/2003 |
| EP | 0796780 A2 | 9/1997 |

(Continued)

OTHER PUBLICATIONS

International Search Report, issued by International Searching Authority in corresponding International Application No. PCT/JP2016/079162, dated Nov. 8, 2016, (PCT/ISA/210).

(Continued)

*Primary Examiner* — Keith J Frisby
(74) *Attorney, Agent, or Firm* — Sughrue Mion, PLLC

(57) ABSTRACT

Drive-side engagement protrusions (66, 66) formed on the outer surface of a drive-side cam (29a) are press-fitted in engagement cutouts (75, 75) formed in a second joining section (70) of an adjustment lever (23a), and a fitting hole (74) formed in the second joining section (70) of the adjustment lever (23a) is fitted over and affixed, by interference fit, to the portion of a rod-like member (17a), which is located near one end thereof in the axial direction. As a result, the adjustment lever (23a), the drive-side cam (29a), and the rod-like member (17a) are joined so as to be rotatable together. The provided structure can prevent the adjustment lever from rocking and rattling even in an unlocked state.

14 Claims, 14 Drawing Sheets

(58) Field of Classification Search
USPC .......................................... 280/775; 74/493
See application file for complete search history.

(56) References Cited

U.S. PATENT DOCUMENTS

| | | |
|---|---|---|
| 2009/0241721 A1 | 10/2009 | Inoue et al. |
| 2014/0373663 A1 | 12/2014 | Hahn et al. |
| 2015/0053041 A1* | 2/2015 | Schnitzer ............... B62D 1/184 74/493 |
| 2016/0121919 A1 | 5/2016 | Mihara |
| 2017/0072986 A1 | 3/2017 | Ishii et al. |

FOREIGN PATENT DOCUMENTS

| | | | |
|---|---|---|---|
| EP | 1747966 | A2 | 1/2007 |
| GB | 2352286 | A | 1/2001 |
| JP | 63-99029 | U | 6/1988 |
| JP | 2003-184994 | A | 7/2003 |
| JP | 2009190654 | A * | 8/2009 |
| JP | 2009-227181 | A | 10/2009 |
| WO | 2013/097922 | A1 | 7/2013 |
| WO | 2015/046432 | A1 | 4/2015 |
| WO | 2015/145845 | A1 | 10/2015 |

OTHER PUBLICATIONS

Written Opinion, issued by International Searching Authority in corresponding International Application No. PCT/JP2016/079162, dated Nov. 8, 2016, (PCT/ISA/237).

International Preliminary Report on Patentability issued from the International Bureau in counterpart International Application No. PCT/JP2016/079162, dated Aug. 31, 2017, (PCT/IPEA/409).

Communication issued Oct. 12, 2018, issued by the European Patent Office in counterpart European Patent Application No. 16851923.9.

* cited by examiner

LOCK DIRECTION

FIG.17A
PRIOR ART
FIG.17B
PRIOR ART
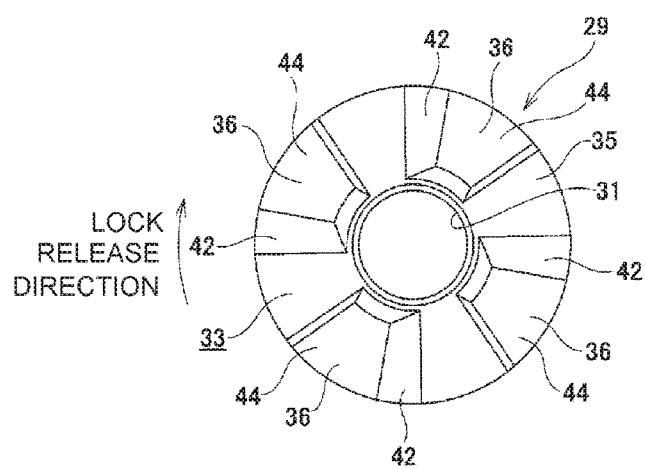
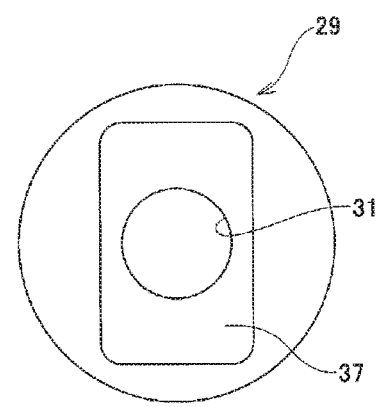
FIG.17C
PRIOR ART
FIG.17D
PRIOR ART
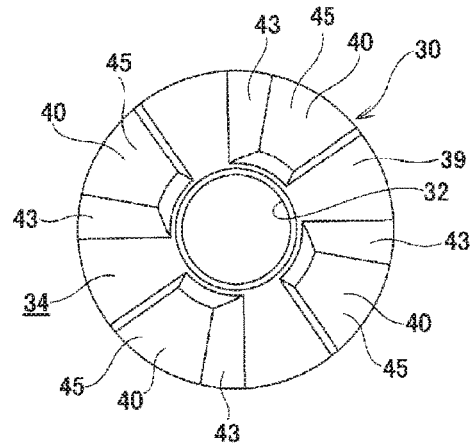
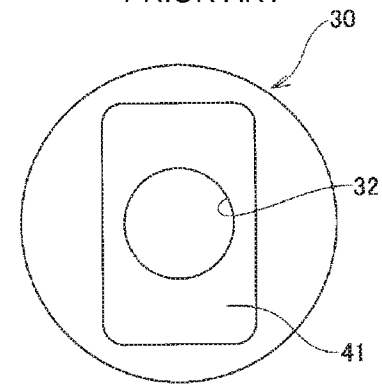

ADJUSTMENT LEVER ASSEMBLY, AND POSITION ADJUSTMENT DEVICE FOR STEERING WHEEL

TECHNICAL FIELD

The present invention relates to improvements on a position adjustment device for steering wheel capable of adjusting a height position of a steering wheel for steering a vehicle, for example.

RELATED ART

As shown in FIG. 14, a steering device for vehicle is configured to transmit rotation of a steering wheel 1 to an input shaft 3 of a steering gear unit 2, and to push and pull a pair of left and right tie-rods 4, 4 in association with rotation of the input shaft 3, thereby applying a steering angle to front wheels. The steering wheel 1 is supported and fixed to a rear end portion of a steering shaft 5. The steering shaft 5 is rotatably supported to a cylindrical steering column 6 with being inserted in the steering column 6 in an axial direction. A front end portion of the steering shaft 5 is connected to a rear end portion of an intermediate shaft 8 via a universal joint 7. A front end portion of the intermediate shaft 8 is connected to the input shaft 3 via a separate universal joint 9.

Regarding the steering device configured as described above, a steering device including a tilt mechanism for adjusting a vertical position of the steering wheel 1 and a telescopic mechanism for adjusting a position in a front and rear position in correspondence to a physique and a driving posture of a driver has been known (for example, refer to Patent Document 1). In the shown structure, in order to configure the tilt mechanism, an upper front end portion of a housing 10 fixed to a front end portion of the steering column 6 is supported to a vehicle body 11 so that it can be swingably displaced by a tilt shaft 12 arranged in a width direction (the width direction indicates a width direction of the vehicle body and coincides with the left and right direction. This applies to the specification and the claims.).

Also, a displacement bracket 13 is provided on a lower surface of an axially intermediate part of the steering column 6. A support bracket 14 is provided with clamping the displacement bracket 13 from both sides in the width direction. The support bracket 14 is formed with long holes 15 for tilt, which are long in a vertical direction, and the displacement bracket 13 is formed at portions, which are aligned with portions of both the long holes 15 for tilt, with through-holes 16. A rod-shaped member 17 is inserted in the long holes 15 for tilt and the through-holes 16 in the width direction. Also, the steering shaft 5 and the steering column 6 are configured to be expanded and contracted, in conformity to the above-described configuration. In the shown structure, the through-holes 16 are configured as long holes that are long in a front and rear direction, so that it is possible to adjust a position of the steering wheel 1 in the front and rear direction. When an adjustment lever (not shown) provided at one end portion of the rod-shaped member 17 is operated, a force of clamping the displacement bracket 13 from both sides in the width direction by the support bracket 14 is adjusted and a position of the steering wheel 1 can be adjusted.

A more specific structure of the steering device having a position adjustment device for steering wheel is described with reference to FIGS. 15 and 16.

A front part of an outer column 18 arranged at a rear side of the steering column 6 and a rear part of an inner column 19 arranged at a front side are slidably fitted, so that an entire length of the steering column 6 can be extended or shortened. The front part of the outer column 18 manufactured by die-casting a light alloy is provided with a slit 20, so that an inner diameter of the front part of the outer column 18 can be elastically expanded and contracted. Also, a pair of left and right clamped plate parts 21, 21 is provided at parts at which the slit 20 is clamped from both the left and right sides, and the displacement bracket 13 is configured by both the clamped plate parts 21, 21. Also, both the clamped plate parts 21, 21 are formed with through-holes 16, 16, which are long in the front and rear direction. Also, a pair of left and right support plate parts 22, 22 provided to the support bracket 14 is arranged at portions at which the displacement bracket 13 is clamped from both the left and right sides. Both the support plate parts 22, 22 are formed with long holes 15, 15 for tilt, each of which has a partial arc shape about a tilt shaft 12 (refer to FIG. 14) and is long in the vertical direction. The rod-shaped member 17 is inserted into both the long holes 15, 15 for tilt and both the through-holes 16, 16 in the width direction. In other words, the rod-shaped member 17 extends over the support plate parts 22, 22.

Also, one end portion of the rod-shaped member 17 in the axial direction is provided with an adjustment lever 23, the other end portion in the axial direction is provided with a nut 24, which is an anchor part, and a thrust bearing 27 and a cam device 25 are provided at parts near one end of an axially intermediate part, so that a tilt lock mechanism configured to expand and reduce an interval between inner surfaces of both the support plate parts 22, 22 on the basis of swinging of the adjustment lever 23 is configured. Although the rod-shaped member 17 can vertically move along both the long holes 15, 15 for tilt, it is not rotated in association with the swinging of the adjustment lever 23.

In the above steering device, the cam device 25 configured by combining a drive-side cam 29 and a driven-side cam 30 is incorporated, as shown in FIG. 17. The drive-side cam 29 and the driven-side cam 30 are respectively formed with center holes 31, 32 for inserting therein the rod-shaped member 17, and have a circular ring plate shape as a whole, respectively. Surfaces of the cams 29, 30 to face each other form a drive-side cam surface 33 and a driven-side cam surface 34, each of which is a concave-convex surface in a circumferential direction. The drive-side cam surface 33 has a drive-side reference surface 35 having a flat surface shape and drive-side protrusions 36, 36 protruding inward in the width direction from a plurality of circumferential portions equidistantly spaced of the drive-side reference surface 35. Also, a drive-side engagement protrusion 37 having a substantially rectangular shape, as seen from the width direction, is formed at a central part of an outer surface of the drive-side cam 29.

The drive-side cam 29 configured as described above is mounted in a state where the drive-side engagement protrusion 37 is inserted to be relatively non-rotatable in a through-hole 38 formed in a base end portion of the adjustment lever 23. In this way, the swinging of the adjustment lever 23 can be transmitted to the drive-side cam 29.

In the meantime, the driven-side cam surface 34 has a driven-side reference surface 39 having a flat surface shape and driven-side protrusions 40, 40 protruding outward in the width direction from a plurality of circumferential portions equidistantly spaced of the driven-side reference surface 39. Also, an inner surface of the driven-side cam 30 is formed with a driven-side engagement protrusion 41.

The driven-side engagement protrusion 41 of the driven-side cam 30 configured as described above is engaged to the long hole 15 for tilt formed in one (the left in FIG. 16) support plate part 22, which faces an inner surface of the driven-side cam 30, of the support plate parts 22, 22 so that it can be only displaced along the long hole 15 for tilt. Therefore, the driven-side cam 30 can also vertically move along the long hole 15 for tilt but does not rotate about its axis. Also, the base end portion of the adjustment lever 23 is joined and fixed to the drive-side cam 29, so that the drive-side cam 29 is reciprocally rotated around the rod-shaped member 17 in association with reciprocal swinging of the adjustment lever 23. Meanwhile, in the above structure, the rod-shaped member 17 is configured not to rotate integrally with the adjustment lever 23 and the drive-side cam 29.

When adjusting a position of the steering wheel 1, the adjustment lever 23 is caused to swing in a predetermined direction (in general, downward) to rotate the drive-side cam 26 in an unlock direction. The respective drive-side protrusions 36, 36 and the respective driven-side protrusions 40, 40 are alternately arranged in the circumferential direction (unlocked state), so that a width dimension of the cam device 28 is reduced and an interval between the driven-side cam 30 and the nut 24 is expanded. As a result, surface pressures of contact parts between the inner surfaces of the support plate parts 22, 22 and outer surfaces of the clamped plate parts 21, 21 are reduced or lost, the inner diameter of the front end portion of the outer column 18 is elastically enlarged, and a surface pressure of a contact part between an inner peripheral surface of the front end portion of the outer column 18 and an outer peripheral surface of the rear end portion of the inner column 19 is reduced. In this state, a position of the steering wheel 1 can be adjusted in the vertical direction and in the front and rear direction within a range in which the rod-shaped member 17 can move in both the long holes 15, 15 for tilt and both the through-holes 16, 16.

In order to hold the steering wheel 1 at a desired position, the steering wheel 1 is moved to the desired position and the adjustment lever 23 is then caused to swing in a reverse direction (generally, upward). Thereby, the drive-side cam 29 is rotated in a lock direction, which is a rotation direction upon switching to a locked state. Then, drive-side guide inclined surfaces 42, which are positioned at the front with respect to the lock direction, of both circumferential side surfaces of the respective drive-side protrusions 36, 36 formed on the drive-side cam surface 33 are sliding-contacted and guided to driven-side guide inclined surfaces 43, which are positioned at the rear with respect to the lock direction, of both circumferential side surfaces of the respective driven-side protrusions 40, 40 formed on the driven-side cam surface 34, and are moved up along the driven-side guide inclined surfaces 43. Thereafter, flat surface-shaped leading end faces 44, 44 of the respective drive-side protrusions 36, 36 and flat surface-shaped leading end faces 45, 45 of the respective driven-side protrusions 40, 40 are butted each other (locked state), so that the width dimension of the cam device 25 is enlarged, and the interval between the inner surfaces of both the support plate parts 22, 22 is reduced. In this state, the surface pressures of the contact parts between the inner surfaces of both the support plate parts 22, 22 and the outer surfaces of both the clamped plate parts 21, 21 are increased, the inner diameter of the front end portion of the outer column 18 is elastically reduced, and the surface pressure of the contact part between the inner peripheral surface of the front end portion of the outer column 18 and the outer peripheral surface of the rear end portion of the inner column 19 is increased. As a result, it is possible to hold the steering wheel 1 at a position after the adjustment.

However, according to the steering device in which the cam device 25 configured as described above is incorporated, in the unlocked state, the adjustment lever 23 may be caused to swing and to rattle relative to the rod-shaped member 17.

CITATION LIST

Patent Documents

Patent Document 1: JP-A-2009-227181

SUMMARY OF THE INVENTION

Problems to be Solved

The present invention has been made in view of the above situations, and is to implement a structure capable of preventing an adjustment lever from swinging and rattling even in an the unlocked state.

Means for Solving Problems

An adjustment lever assembly of the present invention includes a rod-shaped member, a cam device, and an adjustment lever.

The rod-shaped member is provided to extend over a pair of support plate parts supported to a vehicle body with being spaced in a width direction. In the meantime, the pair of support plate parts configures a support bracket supported to the vehicle body, for example, and is provided to hang down from parts spaced in the width direction of a lower surface of an attachment plate part.

The cam device is provided at a part of the rod-shaped member protruding from an outer surface of one support plate part in the width direction, and includes a drive-side cam and a driven-side cam. Specifically, the cam device includes a driven-side cam, which is externally fitted to be axially displaceable relative to the rod-shaped member to a part of the rod-shaped member protruding from an outer surface of one support plate part in the width direction and has a driven-side cam surface formed on an outer surface in the width direction, and a drive-side cam, which is externally fitted to the rod-shaped member at a more outward side than the driven-side cam in the width direction and has a drive-side cam surface formed on an inner surface in the width direction and engaged with the driven-side cam surface.

The adjustment lever has a base end portion joined to the drive-side cam.

The lever assembly of the present invention is configured to operate the cam device in association with rotation of the adjustment lever, thereby increasing and decreasing an interval between both the support plate parts in the width direction to thus implement a state where a steering column provided between both the support plate parts is held and a state where the steering column is released from a holding state.

Particularly, in the adjustment lever assembly of the present invention, a metallic lever core metal configuring the base end portion of the adjustment lever has a joining part for joining with the drive-side cam, and the joining part has a lever-side fitting hole penetrating the same in the width direction and engagement cutouts formed at outer peripheral edges of a plurality of portions with respect to a circumferential direction of the drive-side cam.

Also, an outer surface of the drive-side cam in the width direction is formed with a plurality of engagement protrusions at positions that are aligned with the respective engagement cutouts in the circumferential direction of the drive-side cam.

Also, in a state where both circumferential side surfaces of each of the engagement protrusions are press-fitted to both side surfaces of each of the engagement cutouts with respect to the circumferential direction of the drive-side cam by interference fit, a gap is formed with respect to a radial direction of the drive-side cam between an inner peripheral surface of each of the engagement protrusions with respect to the radial direction of the drive-side cam and a bottom surface of each of the engagement cutouts.

Also, the lever-side fitting hole of the joining part is externally fitted to an outer peripheral surface of the rod-shaped member by interference fit. In other words, the rod-shaped member is press-fitted in the lever-side fitting hole.

Meanwhile, when forming the lever core metal with the respective engagement cutouts, the engagement cutouts may be formed by punching the lever core metal from an inner side toward an outer side in the width direction, in a mounted state.

When implementing the present invention, a configuration where the respective engagement protrusions are formed at a radially outer end portion of an outer surface of the drive-side cam in the width direction may be further adopted.

When implementing the present invention, a configuration where the adjustment lever has a lever main body made of a synthetic resin may be further adopted.

Also, a configuration where the lever core metal is made by a metal plate having an L-shape of which a tip half part and a base half part are continuous and the base half part of the lever core metal is provided with the joining part may be adopted.

When the above configuration is adopted, the tip half part of the lever core metal is molded to the lever main body.

When implementing the above-described configuration, a configuration where a rib is formed on an inner surface of a continuous part between the base half part and the tip half part of the lever core metal may be further adopted. In the meantime, the rib may be formed by press working of pressing an outer surface of the lever core metal.

When implementing the present invention, a configuration where both side surfaces of each of the engagement cutouts are provided in parallel with a virtual plane including a central portion of each of the engagement cutouts with respect to the circumferential direction of the drive-side cam and a central axis of the lever-side fitting hole may be further adopted.

Alternatively, a configuration where both side surfaces of each of the engagement cutouts are provided in non-parallel with a virtual plane including a central portion of each of the engagement cutouts with respect to the circumferential direction of the drive-side cam and a central axis of the lever-side through-hole (for example, both side surfaces of each of the engagement cutouts are provided in a radial direction including a central axis of the lever-side fitting hole) may be adopted.

When the above-described configuration is adopted, specifically, a configuration where a distance between both side surfaces of each of the engagement cutouts with respect to the circumferential direction of the drive-side cam gradually decreases toward an inward side in the radial direction of the drive-side cam may be adopted.

When implementing the above-described configuration, specifically, both side surfaces of one of both side surfaces of each of the engagement cutouts and both circumferential side surfaces of each of the engagement protrusions are formed in a radial direction about a central axis of the drive-side cam. When this configuration is adopted, further, both side surfaces of the other are formed in parallel with both side surfaces of the one.

Also, when implementing the above-described configuration, a configuration where at least one pair of the engagement cutouts is provided at positions that are symmetric with respect to the radial direction of the drive-side cam (positions of which phases are offset by 180°) may be further adopted.

Alternatively, a configuration where at least one pair of the engagement cutouts is provided at positions that are not symmetric with respect to the radial direction of the drive-side cam (positions of which phases are offset by any angle other than 180°) may be adopted.

Alternatively, a configuration where a total of three engagement cutouts are provided and the three engagement cutouts are equidistantly spaced in the circumferential direction (for example, the three engagement cutouts are arranged with phases thereof being offset by 90° and 120°) may be adopted.

Also, a position adjustment device for steering wheel of the present invention includes a steering column, a steering shaft, a displacement bracket, a support bracket, a pair of vehicle body-side through-holes, a displacement-side through-hole, a rod-shaped member, a pressing part, an anchor part, a cam device, and an adjustment lever.

The steering column is configured to be swingably displaced about a tilt shaft arranged in a width direction, for example.

The steering shaft is rotatably supported to an inner side of the steering column, and is provided to fix a steering wheel to a part protruding from an end portion opening of the steering column.

The displacement bracket is provided at an axially intermediate part of the steering column.

The support bracket includes an attachment plate part provided at an upper part thereof and a pair of support plate parts hanging down from the attachment plate part, and is supported to a vehicle body by the attachment plate part with the displacement bracket being clamped by both the support plate parts from both sides in the width direction.

Both the vehicle body-side through-holes have a partial circular arc shape of which a center is the tilt shaft or a rectangular shape that is long in a tangential direction of the circular arc and which is long in a vertical direction, respectively, and are formed at portions of both the support plate parts aligned with each other.

The displacement-side through-hole is a circular hole or a long hole, which is long in a front and rear direction, and is formed to penetrate in the width direction a portion of the displacement bracket, which is aligned with portions of both the vehicle body-side through-holes (long holes for tilt).

The rod-shaped member is inserted into both the vehicle body-side through-holes and the displacement-side through-hole in the width direction.

The pressing part is provided at a part, which is one end portion of the rod-shaped member and protrudes from an outer surface of one support plate part of both the support plate parts.

The anchor part is provided at a part, which is the other end portion of the rod-shaped member and protrudes from an outer surface of the other support plate part of both the support plate parts.

The cam device includes a driven-side cam, which is externally fitted to be axially displaceable relative to the rod-shaped member to the part of the rod-shaped member protruding from the outer surface of one support plate part in the width direction and has a driven-side cam surface formed on an outer surface in the width direction, and a drive-side cam, which is externally fitted to the rod-shaped member at a more outward side than the driven-side cam in the width direction and has a drive-side cam surface formed on an inner surface in the width direction and engaged with the driven-side cam surface. In the meantime, the drive-side cam and the driven-side cam may be made of sintered metal, for example.

Also, the adjustment lever has a base end portion joined to the drive-side cam.

In particular, according to the position adjustment device for steering wheel of the present invention, the base end portion of the adjustment lever is provided with a joining part for joining with the drive-side cam.

Also, the joining part has a lever-side fitting hole penetrating the joining part in the width direction and engagement cutouts formed at outer peripheral edges of a plurality of portions with respect to a circumferential direction of the drive-side cam.

Also, an outer surface of the drive-side cam in the width direction is formed with a plurality of engagement protrusions at positions that are aligned with the respective engagement cutouts with respect to the circumferential direction of the drive-side cam.

Also, in a state where both circumferential side surfaces of each of the engagement protrusions are press-fitted to both side surfaces of each of the engagement cutouts with respect to the circumferential direction of the drive-side cam by interference fit, a gap is formed with respect to a radial direction of the drive-side cam between an inner peripheral surface of each of the engagement protrusions with respect to the radial direction of the drive-side cam and a bottom surface of each of the engagement cutouts.

Also, the lever-side fitting hole of the joining part is externally fitted to an outer peripheral surface of the rod-shaped member by interference fit. In other words, the rod-shaped member is press-fitted in the lever-side fitting hole.

Effects of the Invention

According to the position adjustment device for steering wheel of the present invention configured as described above, it is possible to prevent the adjustment lever from swinging and rattling even in the unlocked state.

That is, according to the present invention, the respective engagement protrusions of the drive-side cam are press-fitted to the respective engagement cutouts formed in the joining part of the adjustment lever, and the lever-side fitting hole formed in the joining part of the adjustment lever is externally fitted to the outer peripheral surface of the rod-shaped member by the interference fit, so that the adjustment lever, the drive-side cam, and the rod-shaped member are mounted to be integrally rotatable. For this reason, it is possible to prevent the adjustment lever from swinging and rattling relative to the rod-shaped member and the drive-side cam in the unlocked state.

BRIEF DESCRIPTION OF THE DRAWINGS

FIG. 17A is a pictorial view depicting a drive-side cam configuring a cam device of the related art, as seen from the front, FIG. 17B is a pictorial view, as seen from the rear, FIG. 17C is a pictorial view of a driven-side cam, as seen from the front, and FIG. 17D is a pictorial view, as seen from the rear.

DETAILED DESCRIPTION OF EMBODIMENTS

First Embodiment

Figure 1:
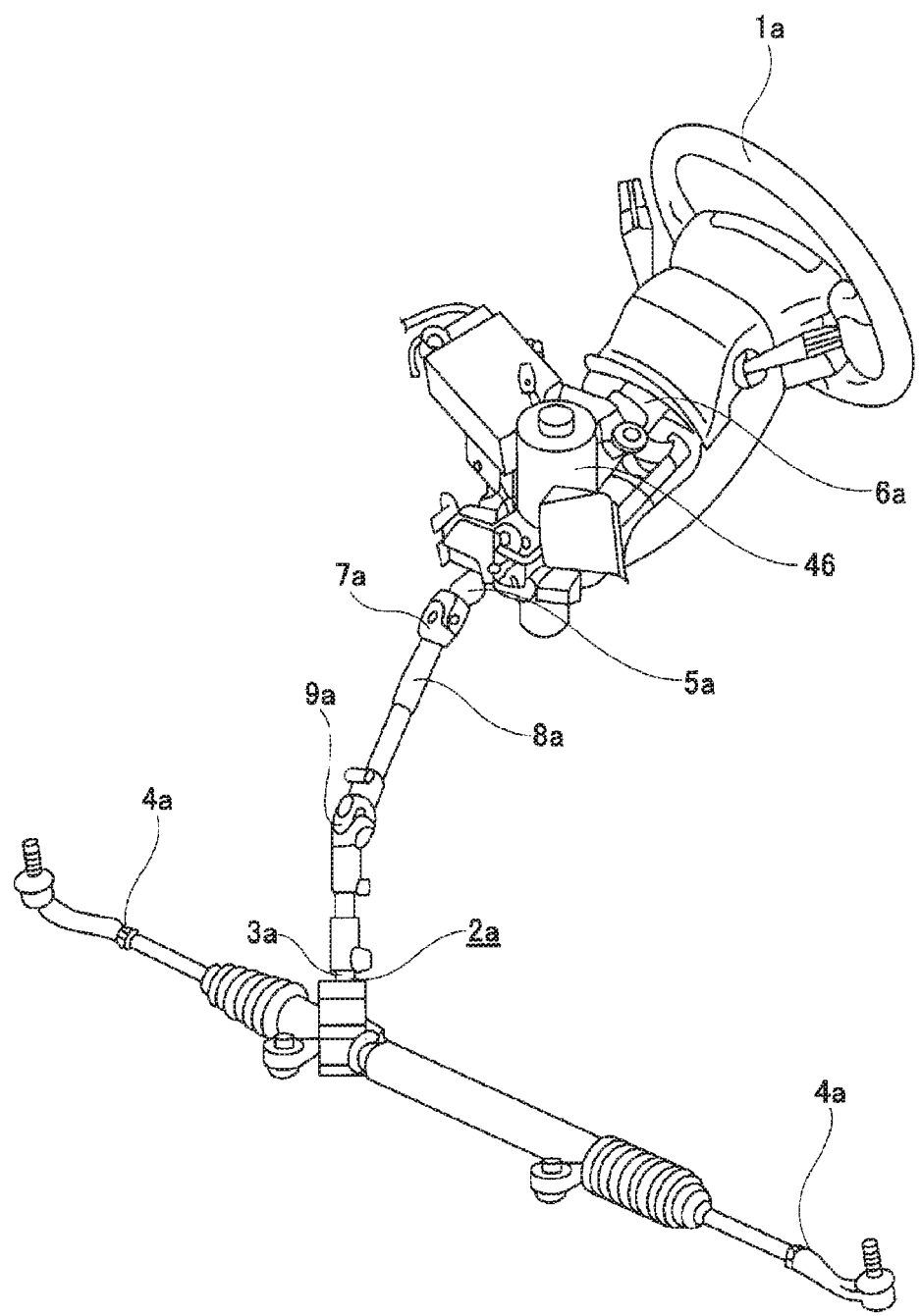
FIG. 1 is a perspective view of a steering device, depicting a first embodiment of the present invention.

A first embodiment of the present invention is described with reference to FIGS. 1 to 9. As shown in FIG. 1, a steering device to which the position adjustment device for steering wheel of the present invention is applied is configured to transmit rotation of a steering wheel $1a$ to an input shaft $3a$ of a steering gear unit $2a$, and to push and pull a pair of left and right tie-rods $4a$, $4a$ via a rack and pinion mechanism in association with rotation of the input shaft $3a$, thereby applying a steering angle to front wheels.

The steering wheel $1a$ is supported and fixed to a rear end portion of a steering shaft $5a$, and the steering shaft $5a$ is rotatably supported to a cylindrical steering column $6a$ with being axially inserted in the steering column $6a$. Also, a front end portion of the steering shaft $5a$ is connected to a rear end portion of an intermediate shaft 8a via a universal joint 7a, and a front end portion of the intermediate shaft 8a is connected to the input shaft 3a via a separate universal joint 9a. Also, in order to apply a steering auxiliary force to the steering shaft 5a, an electric motor 46, which is a power source, is provided in front of the steering column 6a.

Figure 2:
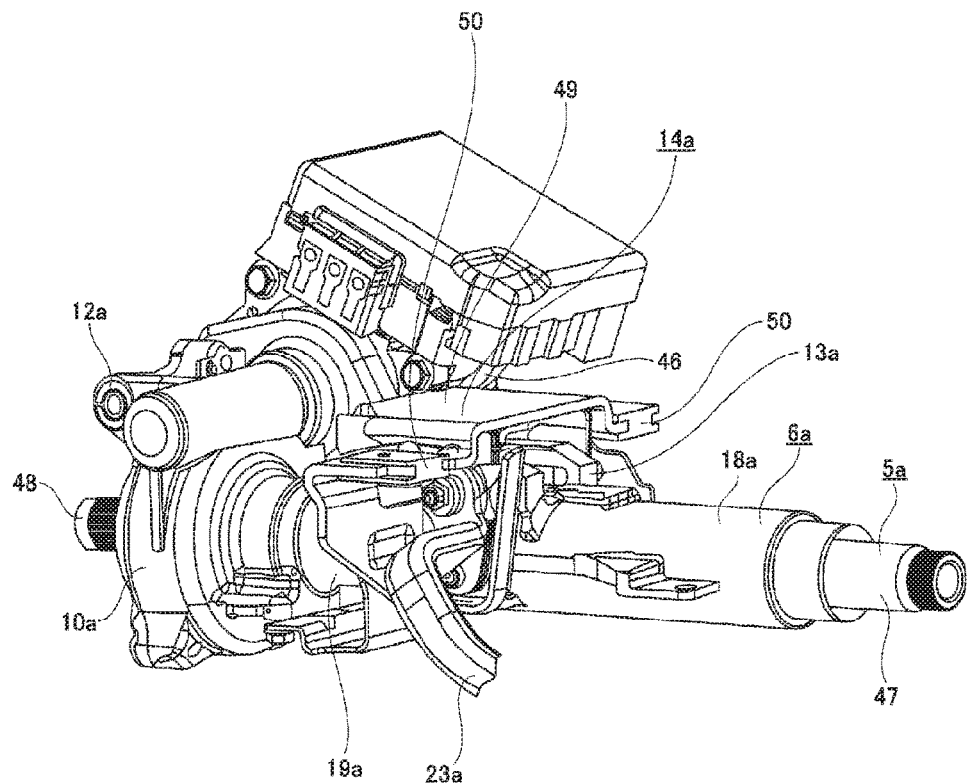
FIG. 2 is a perspective view depicting a specific structure of a steering column device shown in FIG. 1.
Figure 3:
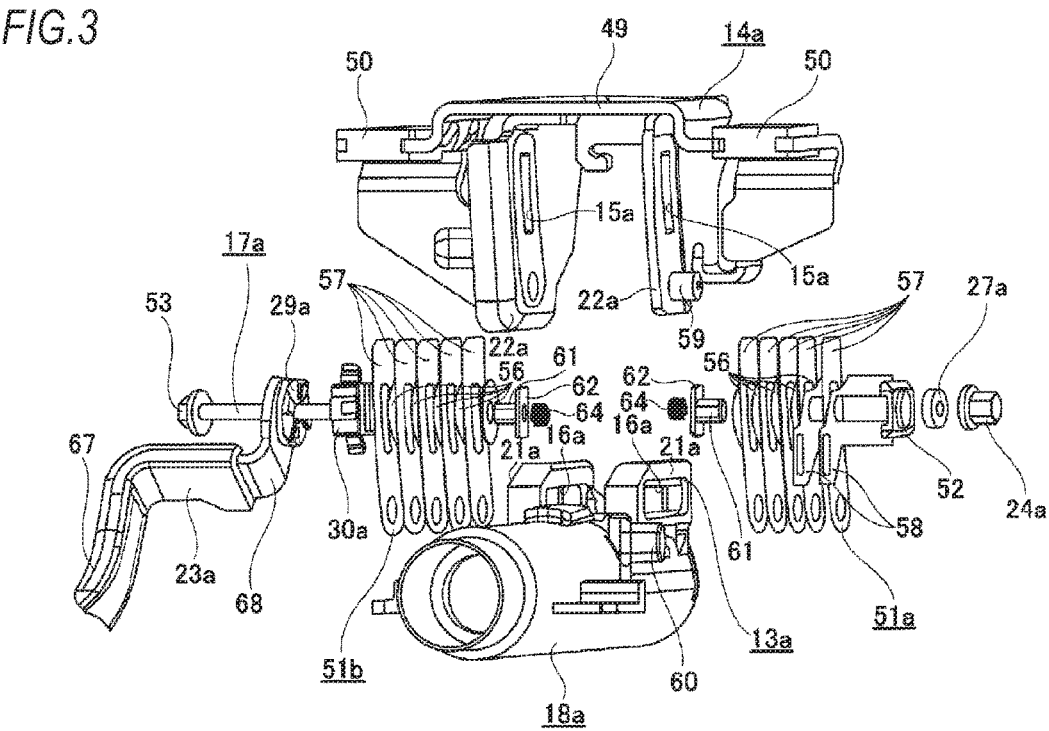
FIG. 3 is an exploded perspective view of the steering column device shown in FIG. 1.
Figure 4:
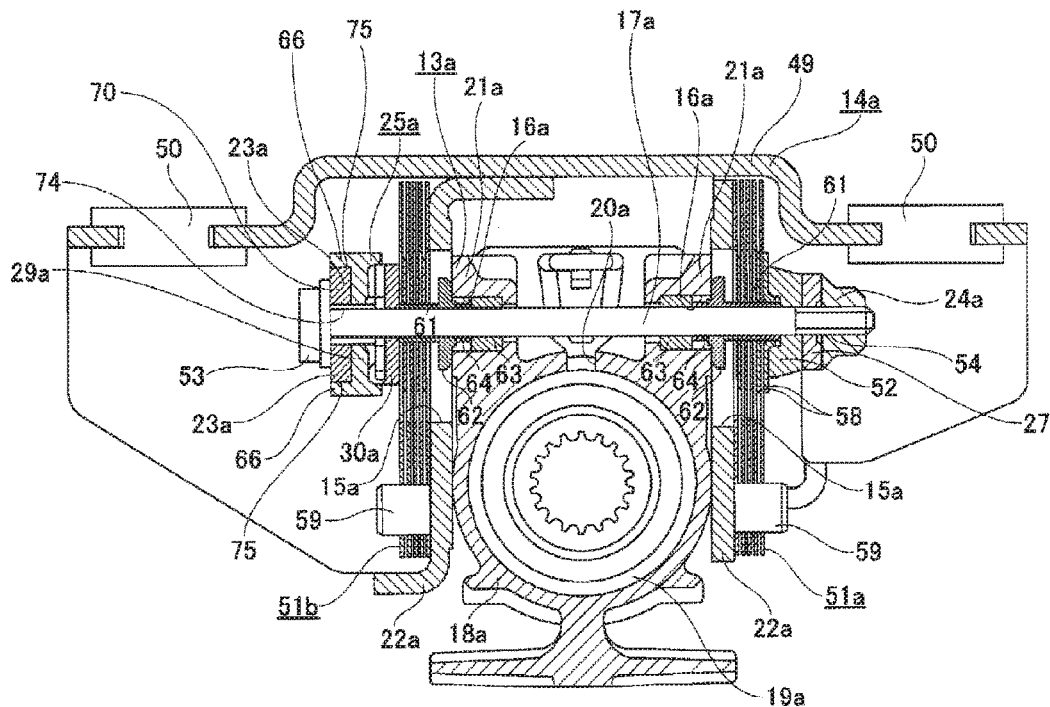
FIG. 4 is a sectional view of the steering column device shown in FIG. 1, which is equivalent to FIG. 16.

A specific structure of the steering column device of the first embodiment is described with reference to FIGS. 2 to 4. The steering shaft 5a having the rear end portion to which the steering wheel 1a is supported and fixed has such a structure that a front end portion of an outer shaft 47 provided at a rear side (a right side in FIG. 2) and a rear end portion of an inner shaft 48 provided at a front side (a left side in FIG. 2) are spline-engaged and a position of the outer shaft 47 in a front and rear direction can be thus adjusted. The steering shaft 5a is supported only to be rotatable to an inner side of the steering column 6a, which includes an outer column 18a and an inner column 19a combined in a telescopic shape (to be expanded and contracted), by a ball bearing of a single-row deep groove type (not shown), for example.

A front end portion of the steering column 6a (the inner column 19a) is fixed to a housing 10a, and an upper front end portion of the housing 10a is supported to be swingably displaced to a vehicle body (not shown) by a tilt shaft 12a arranged in a width direction. Also, in the housing 10a, a worm-type accelerator having a worm and a worm wheel (not shown) and configuring an electric assist mechanism, and the like are arranged. Based on torque to be applied to the outer shaft 47, the worm is rotatively driven by the electric motor 46 fixed to the housing 10a so that a steering auxiliary force is applied to the inner shaft 48.

By the above configuration, it is possible to adjust a vertical position of the steering wheel 1a on the basis of the swinging displacement about the tilt shaft 12a and to adjust a position of the steering wheel 1a in the front and rear direction on the basis of expansion and contraction of the steering shaft 5a and the steering column 6a. In order to hold the steering wheel 1a at a position after adjustment, a displacement bracket 13a is fixed to a part of the steering column 6a and a support bracket 14a is supported to the vehicle body. Specifically, a front upper end portion of the outer column 18a is provided with a slit 20a, which is long in the front and rear direction, so that an inner diameter of the front part of the outer column 18a can be elastically expanded and contracted. Also, a pair of left and right clamped plate parts 21a, 21a is provided at parts at which the slit 20a is clamped from both the left and right sides, so that the displacement bracket 13 is configured. Also, both the clamped plate parts 21a, 21a are formed with through-holes 16a. 16a that are long in the front and rear direction.

Also, the support bracket 14a is provided with clamping the displacement bracket 13a from both sides in the width direction. The support bracket 14a has an attachment plate part 49 provided at an upper part and a pair of left and right support plate parts 22a, 22a hanging down from the attachment plate part 49. The support bracket 14a is supported to the vehicle body via a pair of separation capsules 50, 50 by the attachment plate part 49 so that it can be separated forward upon secondary collision. Specifically, both end portions of the attachment plate part 49 in the width direction are formed with a pair of cutout grooves opening to rear end edges, and the respective separation capsules 50, 50 fixed to the vehicle body by joining members (not shown) are engaged to the respective cutout grooves. Also, both the support plate parts 22a, 22a are formed with long holes 15a, 15a for tilt, each of which is long in the vertical direction and has a partial circular arc shape of which a center is the tilt shaft 12a.

A rod-shaped member 17a is inserted into both the long holes 15a, 15a for tilt and both the through-holes 16a, 16a in the width direction. In the first embodiment, a friction assembly 51a, a rectangular pressing plate 52, and a thrust bearing 27a are arranged in corresponding order from the other (the right in FIG. 4) support plate part 22a of both the support plate parts 22a, 22a between a nut 24a screwed to a male screw portion 54 formed at the other axial end portion of the rod-shaped member 17a and the other support plate part 22a. In the meantime, the rod-shaped member 17a is made of a variety of steel materials such as a carbon steel material for mechanical structure, a rolled steel material for general structure, and the like. Also, an outer peripheral surface (an entire surface or at least a part to which another member is externally fitted and fixed) of the rod-shaped member 17a may be subjected to a quenching treatment.

In the meantime, a friction assembly 51b, a driven-side cam 30a, a drive-side cam 29a, and an adjustment lever 23a are arranged in corresponding order from one (the left in FIG. 4) support plate part 22a of both the support plate parts 22a, 22a between a head 53 provided at one axial end portion of the rod-shaped member 17a and one support plate part 22a.

Meanwhile, in the first embodiment, a part near the other axial end of the head 53 of the rod-shaped member 17a is formed to have a flange shape. Also, in the first embodiment, an outer diameter of the flange-shaped part is smaller than inner diameters of both drive-side engagement protrusions 66, 66 of the drive-side cam 29a, in an assembled state. However, the outer diameter of the flange-shaped part may be made larger than the inner diameters of both the drive-side engagement protrusions 66, 66 so as to contact the drive-side engagement protrusions 66, 66.

The rectangular pressing plate 52 corresponds to the anchor part of the present invention, and an inner surface thereof is engaged with parts (a pair of bent parts bent outward in the width direction from both upper and lower edge portions of the long hole) of a telescopic friction plate 58 configuring the friction assembly 51a. Thereby, the rectangular pressing plate 52 is hindered from being rotated or vertically displaced relative to the telescopic friction plate 58.

Each of the friction assemblies 51a, 51b is configured by stacking a plurality of friction plates. The friction assembly 51a arranged between the other support plate part 22a and the rectangular pressing plate 52 is configured by stacking three types of friction plates of circular ring friction plates 56, 56, friction plates 57, 57 for tilt, and telescopic friction plates 58, 58. In contrast, the friction assembly 51b arranged between one support plate part 22a and the driven-side cam 30a is configured by stacking two types of friction plates of the circular ring friction plate 56, 56 and the friction plates 57, 57 for tilt.

Each of the circular ring friction plates 56, 56 is formed at a central portion with a through-hole in which the rod-shaped member 17a is to be inserted, and has a circular ring shape as a whole.

Each of the friction plates 57, 57 for tilt extends in the vertical direction, is formed at a central portion in the vertical direction with a long hole that is long in the vertical direction and the rod-shaped member 17a is to be inserted therein, and is formed at a lower end portion with an attachment hole that is a circular hole. Fixing pins 59 protruding in the width direction from the outer surfaces of both the support plate parts 22a, 22a are inserted into the respective attachment holes, so that the respective friction plates 57, 57 for tilt are supported to the support bracket 14a.

Each of the telescopic friction plates 58, 58 extends in the front and rear direction, is formed at a central portion in the front and rear direction with a long hole that is long in the front and rear direction and the rod-shaped member 17a is to be inserted therein, and is formed at a rear end portion with an attachment hole that is long in the vertical direction. A fixing pin 60 protruding in the width direction from the outer surface of the other (the right in FIG. 4) clamped plate parts 21a of both the clamped plate parts 21a, 21a is inserted into the respective attachment holes, so that the respective telescopic friction plates 58, 58 are supported to the outer column 18a. In particular, the respective telescopic friction plates 58, 58 are arranged with clamping one friction plate 57 for tilt, which is arranged at the outermost side, of the respective friction plates 57, 57 for tilt configuring the friction assembly 51a from both sides in the width direction. Also, one (outer in the width direction) telescopic friction plate 58 facing the rectangular pressing plate 52 is provided with a pair of bent parts bent outward in the width direction from both upper and lower edge portions of the long hole so as to engage with the rectangular pressing plate 52.

Also, sleeves 61, 61 made of synthetic resin are externally fitted to parts located around the rod-shaped member 17a and arranged at inner sides of the respective friction assembly 51a, 51b. Also, outer peripheral surfaces of inner end portions of the respective sleeves 61, 61 in the width direction are formed with flange portions 62, 62 having a rectangular plate shape, and the respective flange portions 62, 62 are engaged in the tilt long holes 15a, 15a of the respective support plate parts 22a, 22a so that the flange portions can be only displaced along the respective long holes 15a, 15a for tilt. Also, each of the sleeves 61, 61 is used to sub-assembly each of the friction assemblies 51a, 51b (to combine the friction plates 56, 57, 58 each other). Also, cylindrical collars 63, 63 and coil springs 64, 64 are respectively arranged in the through-holes 16a, 16a of the clamped plate parts 21a. 21a. The respective coil springs 64, 64 are elastically compressed between the respective collars 63, 63 and the respective flange portions 62, 62. By the configuration, a frictional force that is to be applied between the drive-side cam 29a and the driven-side cam 30a is improved.

Figure 5:
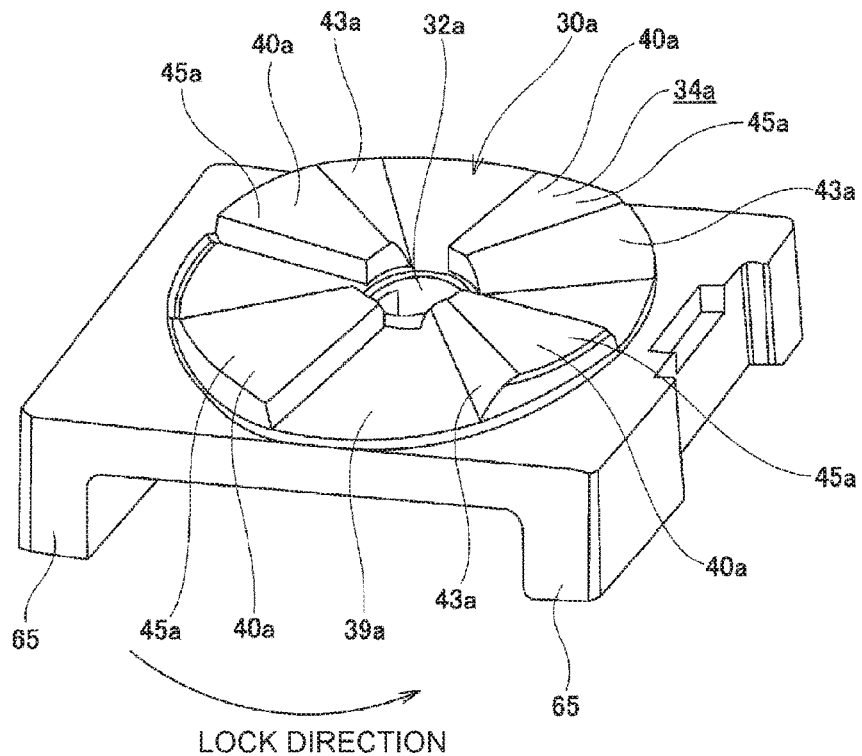
FIG. 5 is a perspective view depicting a driven-side cam.

The driven-side cam 30a configures the cam device 25a together with the drive-side cam 29a. Also, as shown in FIG. 5, the driven-side cam 30a is made of sintered metal, is formed with a center hole 32a in which the rod-shaped member 17a is to be inserted, and has a substantially rectangular plate shape as a whole. Also, an outer surface (an upper surface in FIG. 5) of the driven-side cam 30a is formed with a driven-side cam surface 34a that is a concave-convex surface in the circumferential direction.

The driven-side cam surface 34a has a driven-side reference surface 39a having a flat surface shape and driven-side protrusions 40a, 40a having a substantially trapezoidal section and protruding outward in the width direction from a plurality of circumferential portions (four portions in the shown example) equidistantly spaced of the driven-side reference surface 39a. Also, a rear side of both circumferential side surfaces of the driven-side protrusion 40a with respect to a lock direction, which is a rotation direction of the drive-side cam 29a upon switching to a locked state, is formed with a driven-side guide inclined surface 43a inclined smoothly from the driven-side reference surface 39a.

Also, both end portions of an inner surface of the driven-side cam 30a in the front and rear direction are provided with a pair of engagement protrusions 65, 65 protruding inward in the width direction. The friction assembly 51b (the friction plate 57 for tilt) arranged between one support plate part 22a and the driven-side cam are introduced between both the engagement protrusions 65, 65. Thereby, the driven-side cam 30a is hindered from being rotated relative to the friction assembly 51b.

Figure 6:
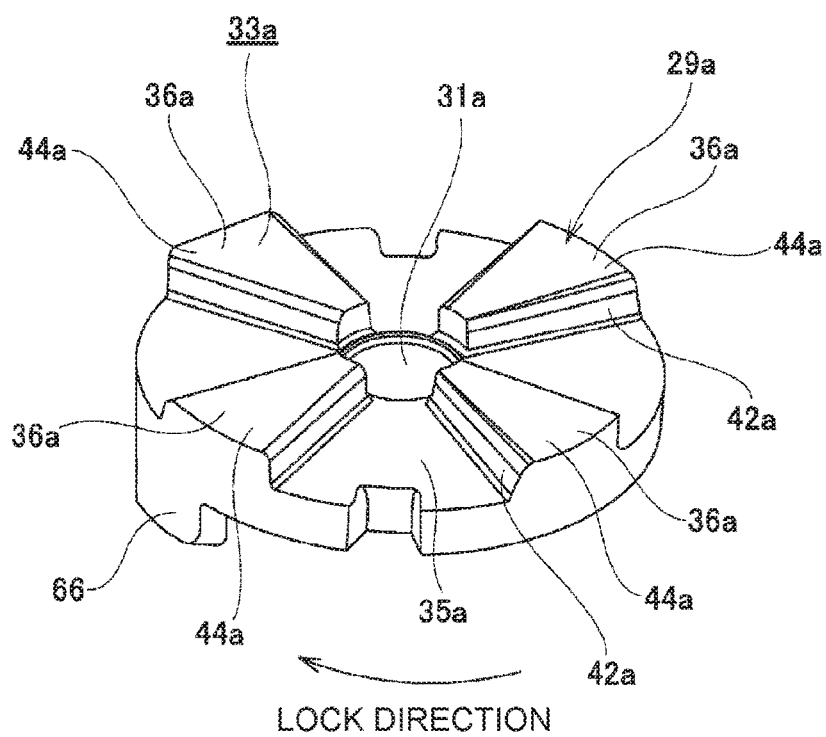
FIG. 6 is a perspective view depicting a drive-side cam.

In the meantime, as shown in FIG. 6, the drive-side cam 29a configuring the cam device 25a together with the driven-side cam 30a configured as described above is made of sintered metal, is formed with a center hole 31a in which the rod-shaped member 17a is to be inserted (loosely inserted with no press-fitting), and has a substantially circular ring plate shape as a whole. Also, an inner surface (an upper surface in FIG. 6) of the drive-side cam 29a is formed with a drive-side cam surface 33a that is a concave-convex surface in the circumferential direction.

The drive-side cam surface 33a has a drive-side reference surface 35a having a flat surface shape and drive-side protrusions 36a, 36a having a substantially trapezoidal section and protruding inward in the width direction from a plurality of circumferential portions (four portions in the shown example) equidistantly spaced of the drive-side reference surface 35a.

A front side of both circumferential side surfaces of each of the drive-side protrusions 36a, 36a with respect to the lock direction is formed with a drive-side guide inclined surface 42a inclined smoothly from the drive-side reference surface 35a.

Also, in the first embodiment, a pair of cylindrical drive-side engagement protrusions 66, 66 protruding outward in the width direction from the outer surface is provided at two positions, which are radially opposite to each other (phases are different by 180°), of a radially outer end portion of an outer surface of the drive-side cam 29a. Also, both circumferential side surfaces of each of both the drive-side engagement protrusions 66, 66 are formed so that a circumferential distance (width dimension) between both circumferential side surfaces does not change in the radial direction. In other words, both circumferential side surfaces of each of both the drive-side engagement protrusions 66, 66 are provided in parallel with a virtual plane $\alpha_1$ including a circumferentially central portion of each of both the drive-side engagement protrusions 66, 66 and a central axis of the center hole 31a of the drive-side cam 29a.

Figure 7:
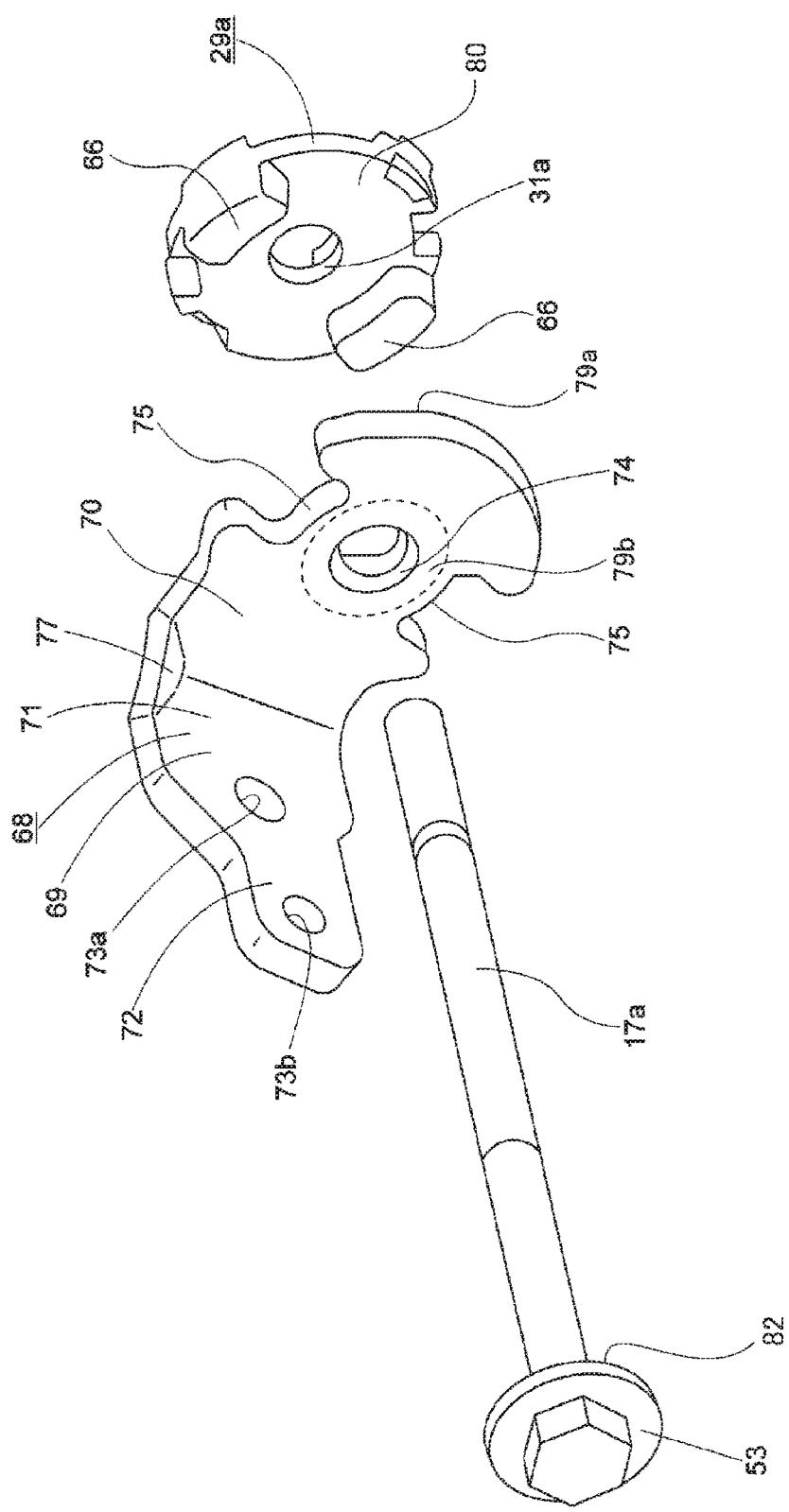
FIG. 7 is an exploded perspective view depicting a rod-shaped member, a lever core metal and the drive-side cam.

Also, in the first embodiment, a part of the outer surface of the drive-side cam 29a except the drive-side engagement protrusions 66, 66 is configured as a flat surface 80 (refer to FIG. 7).

The drive-side cam 29a is mounted to the rod-shaped member 17a with the center hole 31a being clearance-fitted to an outer peripheral surface of a part near one axial end of the rod-shaped member 17a. Therefore, in the mounted state, a radial slight gap is formed over an entire circumference between an inner peripheral surface of the center hole 31a and the outer peripheral surface of the rod-shaped member 17a.

Also, in the first embodiment, the adjustment lever 23a is configured by a lever main body 67 made of synthetic resin and a lever core metal 68 made of metal.

The lever core metal 68 is made by punching a steel plate such as SPCC into a predetermined shape and bending the same into a substantial L-shape, and has a first joining part 69 provided at a tip half part and a second joining part 70 provided at a base half part and corresponding to the joining part of the present invention.

The first joining part 69 has a wide portion 71 provided at a base end-side and a narrow portion 72 provided at a tip end-side and having a width dimension smaller than the wide portion 71. The wide portion 71 and the narrow portion 72 are formed with engagement holes 73a, 73b, respectively.

The second joining part 70 has a substantially circular plate shape, and is formed at a substantial center position with a fitting hole 74 penetrating the second joining part 70 in the width direction and corresponding to the lever-side fitting hole of the present invention. An inner diameter of the fitting hole 74 is slightly smaller than the outer diameter of the part (the part to which the fitting hole 74 is externally fitted) near one axial end of the rod-shaped member 17a. Also, a pair of engagement cutouts 75, 75 is formed at two positions, which are opposite to each other with respect to the radial direction of the drive-side cam 29a, of an outer peripheral edge of the second joining part 70. Both side surfaces (both side surfaces with respect to the circumferential direction of the drive-side cam 29a) of each of both the engagement cutouts 75, 75 are provided in parallel with a virtual plane $α_2$ including a central portion of each of both the engagement cutouts 75, 75 with respect to the circumferential direction of the drive-side cam 29a and a central axis of the fitting hole 74. Also, a distance between both side surfaces of each of both the engagement cutouts 75, 75 is smaller than the distance between both circumferential side surfaces of each of both the drive-side engagement protrusions 66, 66. Also, a length dimension (a depth of both the engagement cutouts 75, 75) of both side surfaces of each of both the engagement cutouts 75, 75 with respect to the radial direction of the drive-side cam 29a is greater than a radial length dimension of both circumferential side surfaces of each of both the drive-side engagement protrusions 66, 66.

In the meantime, outer end edges (portions, which are continuous to portions deviating from each of the engagement cutouts 75, 75, of the outer peripheral edge) of both side surfaces of each of both the engagement cutouts 75, 75 with respect to the radial direction of the drive-side cam 29a are formed with R portions 76, 76 each of which has a circular arc section.

Also, one end portion (an upper end portion in FIG. 7) in the width direction of an inner surface of a continuous part between the first joining part 69 and the second joining part 70 is provided with a rib 77 (a triangular rib). The rib 77 is formed by pressing the continuous part from an outer surface toward an inner surface. In the meantime, the present invention is not limited to the above configuration where the rib is formed by the press working. For example, a configuration where another member is bonded to the inner surface of the continuous part by welding may be adopted.

In order to make the lever core metal 68 having the above configuration, a steel plate such as SPCC is first punched into a predetermined shape to obtain a first intermediate material by press working (punching), and the first intermediate material is bent into a substantial L shape to obtain a second intermediate material by bending. Then, the second intermediate material is subjected to press working for forming the rib 77, the engagement holes 73a, 73b, both the engagement cutouts 75, 75, and the fitting hole 74. In the meantime, the press working may be performed in separate processes, and processes to be incorporated may be collectively performed. Regarding the processes of the press working, the press working (punching) for forming the engagement cutouts 75, 75 is preferably performed to punch the second joining part 70 from an inner surface 79a (in the mounted state, a surface facing toward the drive-side cam 29a) toward an outer surface 79b (in the mounted state, a surface opposite to the drive-side cam 29a), in the mounted state. The reason is to form sagging other than burr at the inner surface-side of the second joining part 70, thereby bringing the outer surface (the flat surface 80) of the drive-side cam 29a into close contact with the inner surface 79a of the second joining part 70.

Figure 8A:
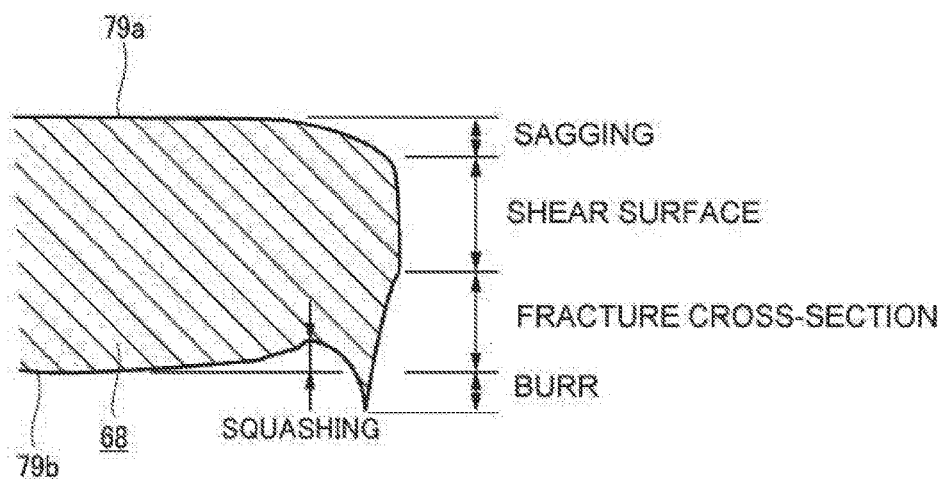
FIG. 8A is an enlarged view of a cut surface of the lever core metal after punching.

That is, the lever core metal 68 is punched from the inner surface 79a toward the outer surface 79b of the second joining part 70, so that portions corresponding to the fitting hole 74 and the engagement cutout 75 are also punched from the inner surface 79a toward the outer surface 79b of the second joining part 70. For this reason, as shown in FIG. 8A, the cut surface of the lever core metal 68 after the punching has a sagging, a shear surface, a fracture cross-section, and a burr formed in corresponding order from the inner surface 79a toward the outer surface 79b.

Figure 8B:
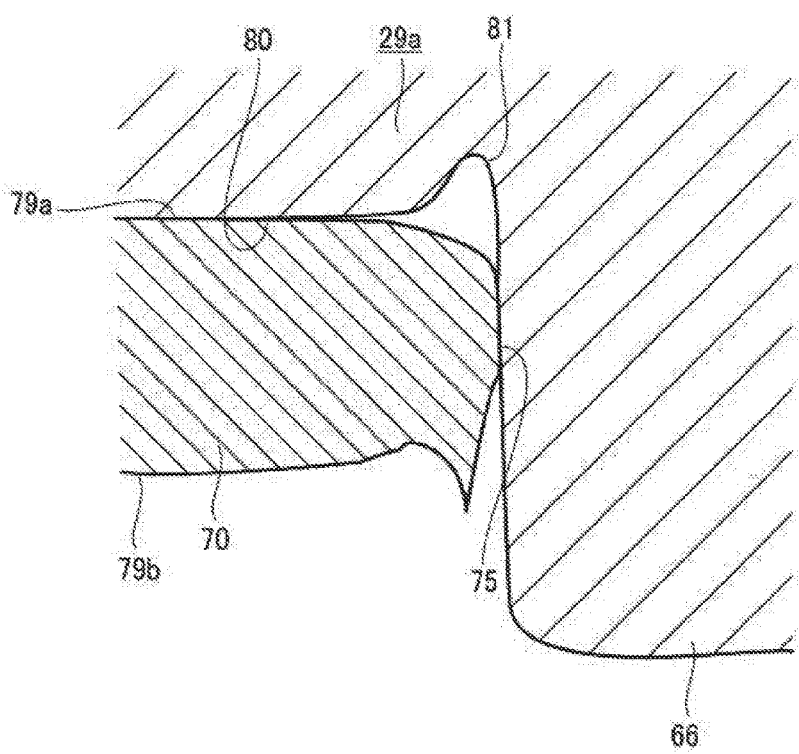
FIG. 8B is an enlarged view of main parts when an engagement cutout of the lever core metal is press-fitted with drive-side engagement protrusion of the drive-side cam.
Figure 9:
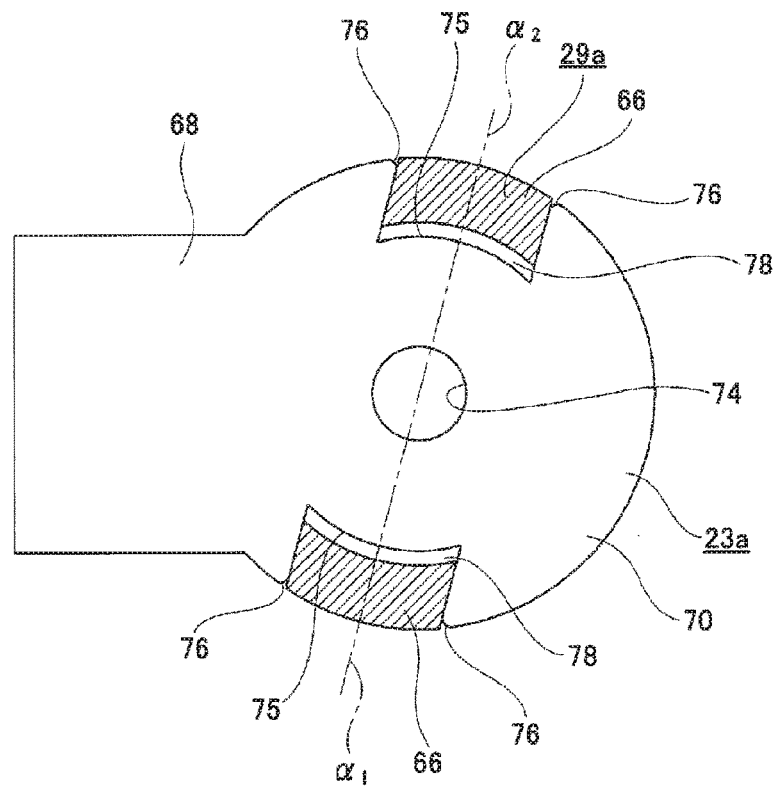
FIG. 9 is a pictorial view depicting a structure of a press-fitting part of the engagement cutout of the lever core metal and the drive-side engagement protrusion of the drive-side cam.

As shown in FIG. 8B, the shear surface part of the engagement cutout 75 is press-fitted to the drive-side engagement protrusion 66 of the drive-side cam 29a, so that the lever core metal 68 and the drive-side cam 29a are fixed. A dimension of the shear surface part can be easily calculated and the press-fitting force can be easily stabilized at the shear surface part.

Also, as shown in FIG. 8B, at least a portion, to which the engagement cutout 75 is contacted, around the drive-side engagement protrusion 66 of the drive-side cam 29a is formed with a concave portion 81. By the concave portion 81, the part corresponding to the sagging of the cut surface is prevented from contacting a corner portion between the flat surface 80 and the drive-side engagement protrusion 66 of the drive-side cam 29a, and a contact surface between the inner surface 79a of the second joining part 70 and the flat surface 80 of the drive-side cam 29a is secured.

Also, in the fitting hole 74, in order to remove the burr existing in the vicinity of the fitting hole 74 after the punching, surface pressing is performed for the corresponding part. Thereby, a contact surface between the outer surface 79b of the second joining part 70 and an inner surface 82 (a right surface in FIG. 3) of the head 53 of the rod-shaped member 17a is secured.

By the above processing, the contact surface between the inner surface 79a of the second joining part 70 and the flat surface 80 of the drive-side cam 29a and the contact surface between the outer surface 79b of the second joining part 70 and the inner surface 82 of the head 53 of the rod-shaped member 17a are secured from upon the mounting. Thereby, it is possible to prevent a situation where a dimension between the inner surface 82 of the head 53 of the rod-shaped member 17a and an inner surface (a left surface in FIG. 3) of the nut 24a is changed over time and the fastening force is thus changed irrespective of the operation of the cam device 25a.

In the first embodiment, the first joining part 69 of the lever core metal 68 is fixed (molded) to a base end portion of the lever main body 67 by insert molding. In the fixed state, synthetic resin configuring the lever main body 67 is located in the engagement holes 73a. 73b formed in the first joining part 69. In this way, the lever main body 67 and the lever core metal 68 are strongly joined.

Also, after the punching of the lever core metal 68, the lever main body 67 to be molded to the lever core metal 68 is prevented from separating from the lever core metal 68 by the burr or squashing shown in FIG. 8A. That is, the lever core metal 68 and the lever main body 67 are securely fixed.

The adjustment lever 23a configured as described above is mounted to the rod-shaped member 17a in a state where the fitting hole 74 formed in the second joining part 70 of the lever core metal 68 is externally fitted and fixed (press-fitted) to an outer peripheral surface of a part near one axial end of the rod-shaped member 17a by the interference fit. Therefore, when the adjustment lever 23a is caused to swing, the rod-shaped member 17a is rotated integrally with the adjustment lever 23a in association with the swinging.

Also, in the state where the rod-shaped member 17a and the adjustment lever 23a are combined as described above, the drive-side cam 29a is mounted to the adjustment lever 23a. That is, in a state where the rod-shaped member 17a is inserted in the center hole 31a of the drive-side cam 29a and the drive-side cam 29a is radially positioned (radially guided), both circumferential side surfaces of each of both the drive-side engagement protrusions 66, 66 are press-fitted between both circumferential side surfaces of each of both the engagement cutouts 75, 75. In the press-fitted state, a radial gap 78 is formed with respect to the radial direction of the drive-side cam 29a between an inner peripheral surface, which is a concave cylindrical surface of each of both the drive-side engagement protrusions 66, 66, and a bottom surface, which is a convex cylindrical surface of each of both the engagement cutouts 75, 75. In the first embodiment, a radial dimension of the radial gap 78 is made greater than a radial dimension of a radial gap between the inner peripheral surface of the center hole 31a of the drive-side cam 29a and the outer peripheral surface of the rod-shaped member 17a.

The radial gap 78 is formed, so that the part corresponding to the sagging of the cut surface of the engagement cutout 75 is prevented from contacting the corner portion between the flat surface 80 and the drive-side engagement protrusion 66 of the drive-side cam 29a, and the contact surface between the inner surface 79a of the second joining part 70 and the flat surface 80 of the drive-side cam 29a is secured.

Also, in the first embodiment, in the mounted state, the outer surface of the drive-side cam 29a and the inner surface of the second joining part 70 of the lever core metal 68 are contacted (closely contacted) each other.

In this way, the drive-side cam 29a and the adjustment lever 23a are joined so as not to be relatively rotatable. Thereby, the drive-side cam 29a is configured to reciprocally rotate integrally with the adjustment lever 23a, in association with reciprocal swinging of the adjustment lever 23a. That is, in the first embodiment, the drive-side cam 29a and the rod-shaped member 17a are configured to synchronously (integrally) rotate, based on the adjustment lever 23a.

In the meantime, when press-fitting both circumferential side surfaces of each of both the drive-side engagement protrusions 66, 66 between both side surfaces of each of both the engagement cutouts 75, 75, the distance between both side surfaces of each of both the engagement cutouts 75, 75 with respect to the circumferential direction of the drive-side cam 29a can be elastically slightly widened. Therefore, regarding the distance between both side surfaces of each of both the engagement cutouts 75, 75 and the distance between both circumferential side surfaces of each of both the drive-side engagement protrusions 66, 66, it is possible to take relatively large dimensional tolerances, so that it is possible to save the processing cost.

Also, although not shown in detail, the thrust bearing 27a arranged between the nut 24a and the other support plate part 22a is a thrust needle bearing including a pair of circular ring plate-shaped races and a plurality of needles (cylindrical rollers) radially arranged between both the races. The dimensions of the respective parts of the thrust bearing 27a are set so that a gap exists in the thrust bearing, in a state where the cam device 25a is switched to the unlocked state. For this reason, while the cam device 25a is switched from the unlocked state to the locked state, the internal gap of the thrust bearing 27a gradually decreases, the respectively needles start to roll, and the respectively needles continue to roll until the cam device is switched to the locked state. Therefore, the thrust bearing 27a is provided, so that it is possible to reduce a frictional force, which is generated when switching the cam device 25a from the unlocked state to the locked state, and to thereby smoothly perform the rotation operation of the adjustment lever 23a.

Also in the first embodiment configured as described above, in order to adjust the position of the steering wheel 1a, the adjustment lever 23a is caused to swing in a predetermined direction (generally, downward), so that the drive-side cam 29a is rotated in the unlock direction. Then, the respective drive-side protrusions 36a, 36a and the respective driven-side protrusions 40a, 40a are alternately arranged (unlocked state) with respect to the circumferential direction, so that the axial dimension of the cam device 25a is shortened, and the interval between the driven-side cam 30a (the pressing part) and the rectangular pressing plate 52 (the anchor part) is widened. As a result, the surface pressures of the contact parts between the inner surfaces of both the support plate parts 22a, 22a and the outer surfaces of both the clamped plate parts 21a, 21a and the surface pressure of the fitting part between the outer column 18a and the inner column 19a are lowered or lost. In this state, a position of the steering wheel 1 can be adjusted in the vertical direction and in the front and rear direction within a range in which the rod-shaped member 17a can move in both the long holes 15a. 15a for tilt and both the through-holes 16a, 16a.

Meanwhile, in the first embodiment, when adjusting the vertical position of the steering wheel 1a, the respective circular ring friction plates 56, 56 and respective telescopic friction plates 58, 58 configuring the respective friction assemblies 51a, 51b are moved in the vertical direction, together with the rod-shaped member 17a. At this time, however, the friction plates 57, 57 for tilt are not displaced. In contrast, when adjusting the position of the steering wheel 1a in the front and rear direction, the respective telescopic friction plates 58, 58 are moved in the front and rear direction together with the outer column 18a but the respective circular ring friction plates 56, 56 and the respective friction plates 57, 57 for tilt are not displaced.

On the other hand, in order to hold the steering wheel 1a at a position after the adjustment, the steering wheel 1a is moved to a desired position and the adjustment lever 23a is then caused to swing in a reverse direction (generally, upward). Then, the drive-side guide inclined surfaces 42a, 42a formed on the circumferential side surfaces of the respective drive-side protrusions 36a, 36a are sliding-contacted and guided to the driven-side guide inclined surfaces 43a, 43a formed on the circumferential side surfaces of the respective driven-side protrusions 40a, 40a, and are moved up along the driven-side guide inclined surfaces 43a, 43a. Thereafter, flat surface-shaped leading end faces 44a, 44a of the respective drive-side protrusions 36a, 36a and flat surface-shaped leading end faces 45a, 45a of the respective driven-side protrusions 40a, 40a are butted (locked) each other, so that the width dimension of the cam device 25a is enlarged, and the interval between the inner surfaces of both the support plate parts 22a. 22a is shortened. In this state, the surface pressures of the contact parts between the inner surfaces of both the support plate parts 22a, 22a and the outer surfaces of both the clamped plate parts 21a, 21a and the surface pressure of the fitting part between the outer column 18a and the inner column 19a are increased, so that it is possible to hold the steering wheel 1a at a position after the adjustment. Also, in the first embodiment, since the respective friction plates 56, 57, 58 are clamped each other, it is possible to increase the force by which the position of the steering wheel 1a in the locked state is held.

Also, according to the position adjustment device for steering wheel of first embodiment, it is possible to prevent the adjustment lever 23a from swinging and rattling even in the unlocked state.

That is, in the first embodiment, both the drive-side engagement protrusions 66, 66 are press-fitted into both the engagement cutouts 75, 75, and the fitting hole 74 of the second joining part 70 is externally fitted to the outer peripheral surface of the rod-shaped member 17a by the interference fit, so that the adjustment lever 23a, the drive-side cam 29a, the rod-shaped member 17a are mounted to be integrally rotatable. For this reason, in the unlocked state, it is possible to prevent the adjustment lever 23a from swinging and rattling relative to the rod-shaped member 17a and the drive-side cam 29a.

Also, in the first embodiment, the lever core metal 68 has such a structure that the steel plate punched into a predetermined shape is bent into a substantial L-shape and the inner surface of the continuous part between the first joining part 69 and the second joining part 70 is provided with the rib 77. Such a structure is adopted, so that it is possible to improve the durability of the lever core metal 68 against a force (a lever operating force) to be applied to the lever core metal 68 upon lever operation, a force (a press-fitting force) to be applied to the lever core metal 68 at the fitting part between the fitting hole 74 of the adjustment lever 23a and the rod-shaped member 17a, a force (a cam reactive force) to be applied from the cam device 25a to the adjustment lever 23a during the operation of the cam device 25a, and a force (a press-fitting force) to be applied to the lever core metal 68 at the press-fitting portions between both the engagement cutouts 75, 75 and both the drive-side engagement protrusions 66, 66.

Also, in the first embodiment, both circumferential side surfaces of each of both the drive-side engagement protrusions 66, 66 of the drive-side cam 29a are respectively provided in parallel with the virtual plane including the circumferentially central portions of both the drive-side engagement protrusions 66, 66 and the central axis of the center hole 31a of the drive-side cam 29a. In this way, a sectional shape of each of both the drive-side engagement protrusions 66, 66 with respect to a virtual plane (the drawing sheet of FIG. 9) perpendicular to the central axis of the drive-side cam 29a is increased. As a result, the rigidity of both the drive-side engagement protrusions 66, 66 is increased to improve the durability of the drive-side cam 29a.

Also, in the first embodiment, the drive-side cam 29a and the lever core metal 68 are positioned with respect to the radial direction of the drive-side cam 29a by the engagement (the clearance fitting with slight gap) between the outer peripheral surface of the rod-shaped member 17a press-fitted to the fitting hole 74 of the lever core metal 68 and the inner peripheral surface of the center hole 31a of the drive-side cam 29a.

Also, in the first embodiment, both circumferential side surfaces of each of both the drive-side engagement protrusions 66, 66 are press-fitted to both side surfaces of each of both the engagement cutouts 75, 75. Like the drive-side cam 29a of the first embodiment, a member made of sintered metal has such a tendency that the strength and durability against the force of the tensile direction are lower than the strength and durability against the force of the compression direction. However, in the first embodiment, since the force of the compression direction with respect to the circumferential direction is applied to both the drive-side engagement protrusions 66, 66, in the mounted state, it is possible to prevent the damage of the drive-side cam 29a and to improve the durability thereof.

Also, in the mounted state, the radial gap 78 exists with respect to the radial direction of the drive-side cam 29a between the inner peripheral surface of each of both the drive-side engagement protrusions 66, 66 and the bottom surface of each of both the engagement cutouts 75, 75. Also, in the first embodiment, the dimension of the radial gap 78 with respect to the radial direction of the drive-side cam 29a is made greater than the radial dimension of the radial gap between the inner peripheral surface of the center hole 31a of the drive-side cam 29a and the outer peripheral surface of the rod-shaped member 17a. For this reason, even when the drive-side cam 29a is radially displaced (deviates) relative to the lever core metal 68, the radial gap between the inner peripheral surface of the center hole 31a of the drive-side cam 29a and the outer peripheral surface of the rod-shaped member 17a is first lost before the radial gap 78 is lost. Accordingly, the inner peripheral surface of each of both the drive-side engagement protrusions 66, 66 and the bottom surface of each of both the engagement cutouts 75, 75 are not contacted to each other. As a result, it is possible to prevent the force (tensile stress) from being applied radially outward from the lever core metal 68 toward both the drive-side engagement protrusions 66, 66, thereby improving the durability of the drive-side cam 29a. Also, in the first embodiment, both the drive-side engagement protrusions 66, 66 are provided at the radially outer end portion of the drive-side cam 29a, and it is possible to secure the large distance from the center of the drive-side cam 29a to both the drive-side engagement protrusions 66, 66. Accordingly, it is possible to suppress the force to be applied to both the drive-side engagement protrusions 66, 66, thereby effectively preventing the damage of both the drive-side engagement protrusions 66, 66.

Second Embodiment

Figure 10:
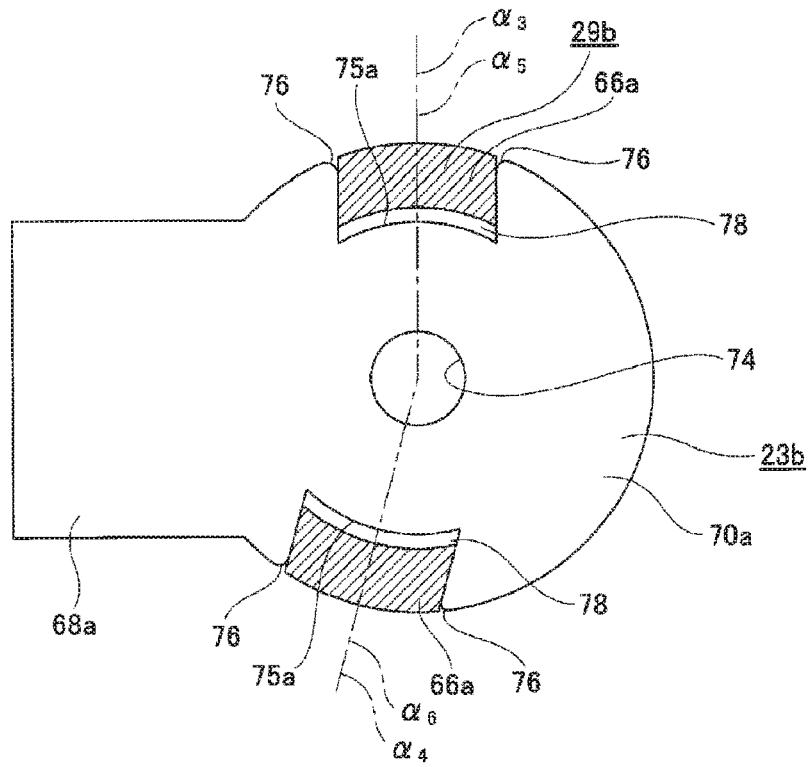
FIG. 10 is a view similar to FIG. 9, depicting a second embodiment of the present invention.

A second embodiment of the present invention is described with reference to FIG. 10. In the second embodiment, a drive-side cam 29b configuring the position adjustment device for steering wheel is made of sintered metal, is formed with the center hole 31a (refer to FIG. 7) in which the rod-shaped member 17a (refer to FIG. 4) is to be inserted, and has a substantially circular ring plate shape as a whole, like the first embodiment. Also, an inner surface of the drive-side cam 29b is formed with the drive-side cam surface 33a (refer to FIG. 6), which is a concave-convex surface in the circumferential direction.

Also, in the second embodiment, a pair of drive-side engagement protrusions 66a, 66a is provided at two circumferential positions of a radially outer end portion of an outer surface of the drive-side cam 29b. Specifically, in the second embodiment, one drive-side engagement protrusions 66a (the drive-side engagement protrusions 66a located at the lower in FIG. 10) of both the drive-side engagement protrusions 66a, 66a is provided at a position slightly (about 10°) deviating in one circumferential direction (a clockwise direction in FIG. 10) from a radially opposite position to the other drive-side engagement protrusions 66a (the drive-side engagement protrusions 66a located at the upper in FIG. 10). In other words, both the drive-side engagement protrusions 66a, 66a are arranged with circumferential phases being offset by 190° (170°).

Also, both circumferential side surfaces of each of both the drive-side engagement protrusions 66a, 66a are respectively formed so that the circumferential distance between both circumferential side surfaces does not change in the radial direction. In other words, both circumferential side surfaces of each of both the drive-side engagement protrusions 66a, 66a are respectively provided in parallel with virtual planes $\alpha_3$, $\alpha_4$ including circumferentially central portions of both the drive-side engagement protrusions 66a, 66a and the central axis of the center hole 31a of the drive-side cam 29b.

Also in the second embodiment, an adjustment lever 23b is configured by the lever main body 67 made of synthetic resin and a lever core metal 68a made of metal.

The structure of the lever main body 67 is similar to the first embodiment.

Also, the lever core metal 68a is made by punching a steel plate such as SPCC into a predetermined shape and then bending the same into a substantial L-shape, like the first embodiment, and has the first joining part 69 (refer to FIG. 7) provided at a tip half part and a second joining part 70a provided at a base half part and corresponding to the joining part of the present invention.

The structure of the first joining part 69 is similar to the first embodiment.

In the meantime, the second joining part 70a has a substantially circular plate shape, and is formed at a substantial center position with the fitting hole 74 penetrating the second joining part 70a in the width direction and corresponding to the lever-side fitting hole of the present invention. The inner diameter of the fitting hole 74 is smaller than the outer diameter of the part (the part to which the fitting hole 74 is externally fitted) near one axial end of the rod-shaped member 17a. Also, a pair of engagement cutouts 75a, 75a is formed at two positions with respect to the circumferential direction of the drive-side cam 29b, which are aligned with both the drive-side engagement protrusions 66a, 66a in the mounted state, of an outer peripheral edge of the second joining part 70a.

Also, both side surfaces (both side surfaces with respect to the circumferential direction of the drive-side cam 29b) of each of both the engagement cutouts 75a. 75a are provided in parallel with virtual planes $\alpha_5$, $\alpha_6$ including central portions of both the engagement cutouts 75a, 75a with respect to the circumferential direction of the drive-side cam 29b and the central axis of the fitting hole 74. Also, a distance between both side surfaces of each of both the engagement cutouts 75a, 75a is smaller than a distance between both circumferential side surfaces of each of both the drive-side engagement protrusions 66a, 66a.

Also in the second embodiment, outer end edges of both side surfaces of each of both the engagement cutouts 75a, 75a with respect to the radial direction of the drive-side cam 29b are formed with R portions 76, 76 each of which has a circular arc section. The other structure of the lever core metal 68a is similar to the structure of the lever core metal 68 of the first embodiment.

The adjustment lever 23b configured as described above is mounted to the rod-shaped member 17a in the state where the fitting hole 74 formed in the second joining part 70a of the lever core metal 68a is externally fitted and fixed (press-fitted) to the outer peripheral surface of the part near one axial end of the rod-shaped member 17a by the interference fit. Therefore, when the adjustment lever 23b is caused to swing, the rod-shaped member 17a is rotated integrally with the adjustment lever 23b, in association with the swinging.

Also, before and after combining the rod-shaped member 17a and the adjustment lever 23b, as described above, the drive-side cam 29b is mounted to the adjustment lever 23b. That is, both circumferential side surfaces of each of both the drive-side engagement protrusions 66a, 66a are press-fitted between both side surfaces of each of both the engagement cutouts 75a, 75a. In the press-fitted state, the radial gap 78 with respect to the radial direction of the drive-side cam 29b exists between an inner peripheral surface of each of both the drive-side engagement protrusions 66a, 66a and a bottom surface of each of both the engagement cutouts 75a, 75a. In the second embodiment, the radial dimension of the radial gap 78 is made greater than the radial dimension of the radial gap between the inner peripheral surface of the center hole 31a of the drive-side cam 29b and the outer peripheral surface of the rod-shaped member 17a.

Also in the second embodiment, in the mounted state, the outer surface of the drive-side cam 29b and the inner surface of the second joining part 70a of the lever core metal 68a are contacted (closely contacted) each other.

In the second embodiment configured as described above, one drive-side engagement protrusion 66a (one engagement cutout 75a) is provided at the position slightly deviating in one circumferential direction from the radially opposite position to the other drive-side engagement protrusions 66a (the other engagement cutouts 75a). For this reason, the positioning of the drive-side cam 29b and the lever core metal 68a with respect to the radial direction of the drive-side cam 29a can be made by the engagement (press-fitting) between both the drive-side engagement protrusions 66a, 66a and both the engagement cutouts 75a, 75a. The other structures and operational effects are similar to the first embodiment.

Third Embodiment

Figure 11:
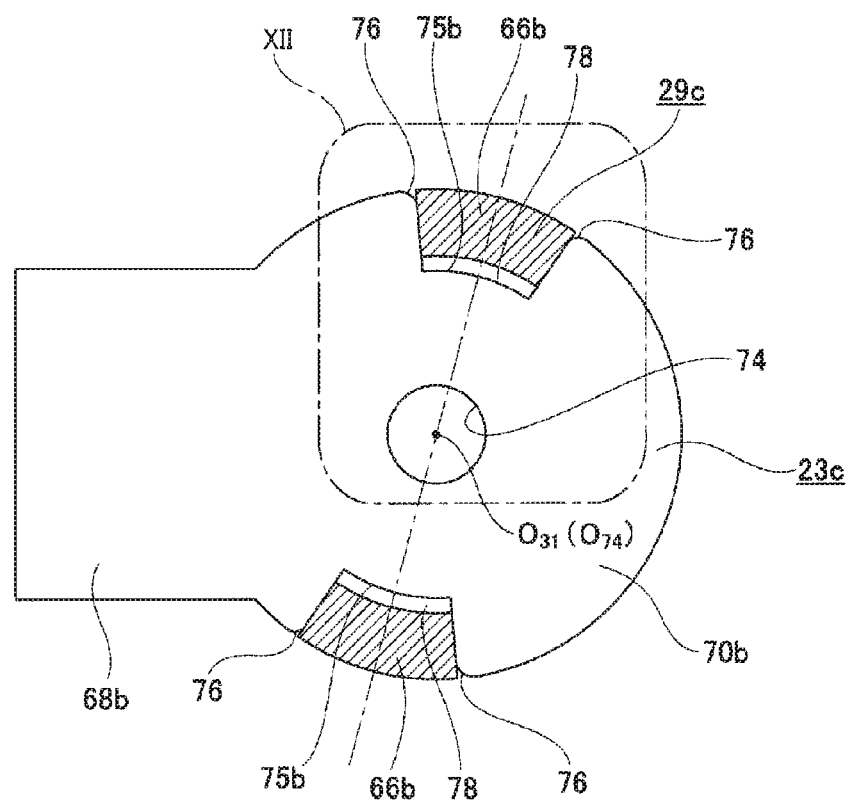
FIG. 11 is a view similar to FIG. 9, depicting a third embodiment of the present invention.
Figure 12A:
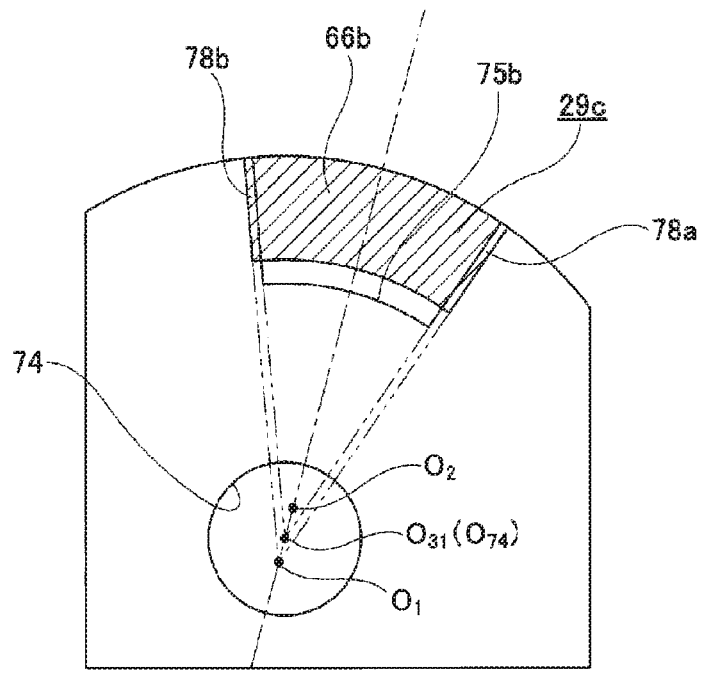
FIG. 12A is a pictorial view corresponding to a XII part of FIG. 11, depicting an example of a structure of both circumferential side surfaces of the drive-side engagement protrusion of the drive-side cam and both side surfaces of the engagement cutout of the lever core metal.

A third embodiment of the present invention is described with reference to FIGS. 11 and 12. In the third embodiment, a drive-side cam 29c configuring the position adjustment device for steering wheel is made of sintered metal, is formed with the center hole 31a in which the rod-shaped member 17a (refer to FIG. 4) is to be inserted, and has a substantially circular ring plate shape as a whole, like the first embodiment. Also, an inner surface of the drive-side cam 29c is formed with the drive-side cam surface 33a (refer to FIG. 6), which is a concave-convex surface in the circumferential direction.

Also, a pair of drive-side engagement protrusions 66b, 66b is provided at two positions (positions of which phases in the circumferential direction are different by 180°), which are opposite to each other in the radial direction, of a radially outer end portion of an outer surface of the drive-side cam 29c. In the meantime, the circumferential positions of both the drive-side engagement protrusions 66b, 66b are similar to both the drive-side engagement protrusions 66, 66 of the first embodiment.

In the third embodiment, both circumferential side surfaces of each of both the drive-side engagement protrusions 66b, 66b are formed so that a circumferential distance between both circumferential side surfaces is smaller toward the radially inward side. In other words, both circumferential side surfaces of each of both the drive-side engagement protrusions 66b, 66b are provided in parallel with a radial direction about a central axis $O_{31}$ of the center hole 31a of the drive-side cam 29c. Specifically, in the third embodiment, both circumferential side surfaces of one (upper in FIG. 11) drive-side engagement protrusion 66b of both the drive-side engagement protrusions 66b, 66b are provided in a radial direction about a central axis $O_1$ offset from the central axis $O_{31}$ in a direction of separating from one drive-side engagement protrusion 66b. In the meantime, although not shown, both circumferential side surfaces of each of the other (lower in FIG. 11) drive-side engagement protrusion 66b of both the drive-side engagement protrusions 66b, 66b are provided in a radial direction about a central axis $O_2$ offset from the central axis $O_{31}$ in a direction of separating from the other drive-side engagement protrusion 66b.

Also in the third embodiment, an adjustment lever 23c is configured by the lever main body 67 made of synthetic resin and a lever core metal 68b made of metal.

The structure of the lever main body 67 is similar to the first embodiment.

Also, the lever core metal 68b is made by punching a steel plate such as SPCC into a predetermined shape and then bending the same into a substantial L-shape, like the first embodiment, and has the first joining part 69 (refer to FIG. 7) provided at a tip half part and a second joining part 70b provided at a base half part and corresponding to the joining part of the present invention.

The structure of the first joining part 69 is similar to the first embodiment.

In the meantime, the second joining part 70b has a substantially circular plate shape, and is formed at a substantial center position with the fitting hole 74 penetrating the second joining part 70b in the width direction and corresponding to the lever-side fitting hole of the present invention. The inner diameter of the fitting hole 74 is smaller than the outer diameter of the part (the part to which the fitting hole 74 is externally fitted) near one axial end of the rod-shaped member 17a. Also, a pair of engagement cutouts 75b, 75b is formed at two positions, which are opposite to each other with respect to the radial direction of the drive-side cam 29c and are aligned with both the drive-side engagement protrusions 66b, 66b in the mounted state, of an outer peripheral edge of the second joining part 70b.

Also, both side surfaces (both side surfaces with respect to the circumferential direction of the drive-side cam 29c) of each of both the engagement cutouts 75b, 75b are formed so that a distance between both side surfaces with respect to the circumferential direction of the drive-side cam 29c is smaller toward the radially inward side of the drive-side cam 29c. In other words, both side surfaces of each of both the engagement cutouts 75b, 75b are provided in a radial direction about a central axis $O_{74}$ of the fitting hole 74 (in the mounted state, the central axis $O_{31}$ of the drive-side cam 29c). Therefore, in a free state, both side surfaces of each of both the engagement cutouts 75b, 75b are formed in parallel with both circumferential side surfaces of each of both the drive-side engagement protrusions 66b. Also, a distance between both side surfaces of each of both the engagement cutouts 75b, 75b is smaller than the distance between both circumferential side surfaces of each of both the drive-side engagement protrusions 66b, 66b of the drive-side cam 29b by a magnitude within which both the drive-side engagement protrusions 66b, 66b can be press-fitted into both the engagement cutouts 75b, 75b by the interference fit. Also, a length dimension of both side surfaces of each of both the engagement cutouts 75b, 75b with respect to the radial direction of the drive-side cam 29c (a depth of each of both the engagement cutouts 75b, 75b) is greater than a radial length dimension of both circumferential side surfaces of each of both the drive-side engagement protrusions 66b, 66b.

In the meantime, also in the third embodiment, outer end edges of both side surfaces of each of both the engagement cutouts 75b, 75b with respect to the radial direction of the drive-side cam 29c are formed with R portions 76, 76 each of which has a circular arc section. The other structure of the lever core metal 68b is similar to the structure of the lever core metal 68 of the first embodiment.

The adjustment lever 23c configured as described above is mounted to the rod-shaped member 17a in the state where the fitting hole 74 formed in the second joining part 70b of the lever core metal 68b is externally fitted and fixed (press-fitted) to the outer peripheral surface of the part near one axial end of the rod-shaped member 17a by the interference fit. Therefore, when the adjustment lever 23c is caused to swing, the rod-shaped member 17a is rotated integrally with the adjustment lever 23c, in association with the swinging.

Also, before and after combining the rod-shaped member 17a and the adjustment lever 23c, as described above, the drive-side cam 29c is mounted to the adjustment lever 23c. That is, both circumferential side surfaces of each of both the drive-side engagement protrusions 66b, 66b are press-fitted between both side surfaces of each of both the engagement cutouts 75b, 75b. In the press-fitted state, the radial gap 78 with respect to the radial direction of the drive-side cam 29c exists between an inner peripheral surface of each of both the drive-side engagement protrusions 66b, 66b and a bottom surface of each of both the engagement cutouts 75b, 75b. Also, in the third embodiment, in the press-fitted state, interferences 78a, 78b (refer to FIG. 12A) of the press-fitting parts between both circumferential side surfaces of each of both the drive-side engagement protrusions 66b, 66b and both side surfaces of each of both the engagement cutouts 75b, 75b do not change with respect to the radial direction of the drive-side cam 29c. In the meantime, FIG. 12A pictorially depicts a relation between the drive-side engagement protrusion 66b (one drive-side engagement protrusion 66b) located at the upper side in FIG. 11 and the engagement cutout 75b (one engagement cutout 75b) located at the upper side in FIG. 11, in the free state. A relation between the drive-side engagement protrusion 66b (the other drive-side engagement protrusion 66b) located at the lower side in FIG. 11 and the engagement cutout 75b (the other engagement cutout 75b) located at the lower side in FIG. 11 is also similar.

Also in the third embodiment, in the mounted state, the outer surface of the drive-side cam 29c and the inner surface of the second joining part 70a of the lever core metal 68b are contacted (closely contacted) each other.

Figure 12B:
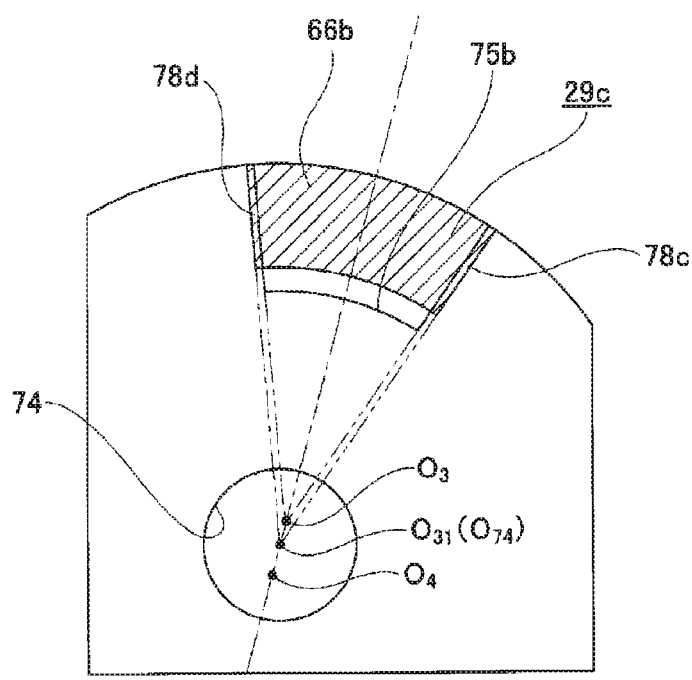
FIG. 12B is a pictorial view depicting another example.

In the meantime, both the drive-side engagement protrusions 66b, 66b and both the engagement cutouts 75b, 75b are configured as shown in FIG. 12B. That is, in the structure shown in FIG. 12B, both circumferential side surfaces of each of both the drive-side engagement protrusions 66b. 66b are provided in the radial direction about the central axis $O_{31}$ of the center hole 31a of the drive-side cam 29c. On the other hand, both side surfaces of each of both the engagement cutouts 75b, 75b are provided in parallel with the radial direction about the central axis $O_{74}$ of the fitting hole 74 (in the mounted state, the central axis $O_{31}$ of the drive-side cam 29c). Specifically, in the structure shown in FIG. 12B, both circumferential side surfaces of one (upper in FIG. 11) engagement cutout 75b of both the engagement cutouts 75b, 75b are provided in a radial direction about a center $O_3$ offset from the central axis $O_{74}$ of the fitting hole 74 toward a direction of coming close to one engagement cutout 75b, as shown in FIG. 12B. Also, although not shown, both circumferential side surfaces of each of the other (lower in FIG. 11) the engagement cutout 75b of both the engagement cutouts 75b, 75b are provided in a radial direction about a central axis $O_4$ offset from the central axis $O_{74}$ in a direction of coming close to the other engagement cutout 75b. Also in this structure, in the state where both circumferential side surfaces of each of both the drive-side engagement protrusions 66b, 66b are press-fitted between both side surfaces of each of both the engagement cutouts 75b, 75b, interferences 78c, 78d (refer to FIG. 12B) of the press-fitting parts between both circumferential side surfaces of each of both the drive-side engagement protrusions 66b, 66b and both side surfaces of each of both the engagement cutouts 75b, 75b do not change with respect to the radial direction of the drive-side cam 29c.

Also, the shapes of both circumferential side surfaces of each of both the drive-side engagement protrusions 66b, 66b and both side surfaces of each of both the engagement cutouts 75b, 75b are not limited to the shapes shown in FIG. 12. For example, a variety of structures capable of press-fitting both circumferential side surfaces of each of both the drive-side engagement protrusions 66b, 66b between both side surfaces of each of both the engagement cutouts 75b, 75b with interferences can be adopted. For example, a structure where both side surfaces of one of both circumferential side surfaces of each of both the drive-side engagement protrusions 66b, 66b and both side surfaces of each of both the engagement cutouts 75b, 75b are provided in the radial direction about the central axis $O_{31}$ of the center hole 31a (the central axis $O_{74}$ of the fitting hole 74) of the drive-side cam 29c, both side surfaces of the other are provided in the radial direction about the central axis $O_{31}$ (the central axis $O_{74}$) and a central angle between both side surfaces of the other is formed smaller than a central angle between both side surfaces of one can be adopted. Also, both side surfaces of one may be provided in the radial direction about the central axis $O_{31}$ (the central axis $O_{74}$) and both side surfaces of the other may be provided to be inclined relative to the radial direction.

Meanwhile, in the respective structures about both circumferential side surfaces of each of both the drive-side engagement protrusions 66b, 66b and both side surfaces of each of both the engagement cutouts 75b, 75b, a radial center (a position at which both side surfaces intersect each other) of the virtual plane on which both side surfaces of any one of both circumferential side surfaces of each of both the drive-side engagement protrusions 66b, 66b and both side surfaces of each of both the engagement cutouts 75b, 75b exist coincides with the central axis $O_{31}$ (the central axis $O_{74}$). However, a configuration where the radial center of the virtual plane on which both circumferential side surfaces of each of both the drive-side engagement protrusions 66b. 66b (both side surfaces of each of both the engagement cutouts 75b, 75b) exist is offset from the central axis $O_{31}$ (the central axis $O_{74}$) may be adopted. When this configuration is adopted, both circumferential side surfaces of each of both the drive-side engagement protrusions 66b, 66b and both side surfaces of each of both the engagement cutouts 75b, 75b are preferably formed to be parallel with each other. However, a configuration where both circumferential side surfaces of each of both the drive-side engagement protrusions 66b, 66b and both side surfaces of each of both the engagement cutouts 75b, 75b are not parallel with each other may also be adopted. In any configuration, both circumferential side surfaces of each of both the drive-side engagement protrusions 66b. 66b are configured to be press-fitted to both side surfaces of each of both the engagement cutouts 75b, 75b with interferences.

In the third embodiment configured as described above, the circumferential distance between both circumferential side surfaces of each of both the drive-side engagement protrusions 66b. 66b is formed to be smaller toward the radially inward side, and the distance between both side surfaces of each of both the engagement cutouts 75b, 75b with respect to the circumferential direction of the drive-side cam 29c is formed to be smaller toward the radially inward side of the drive-side cam 29c. For this reason, the positioning of the drive-side cam 29c and the lever core metal 68b with respect to the radial direction of the drive-side cam 29c can be made by the engagement (press-fitting) between one drive-side engagement protrusions 66b (the other drive-side engagement protrusion 66b) and one engagement cutouts 75b (the other engagement cutout 75b). Also, since it is possible to support the force to be applied to both the drive-side engagement protrusions 66b. 66b by the surfaces, it is possible to effectively prevent the damage of both the drive-side engagement protrusions 66b, 66b.

Also, in the third embodiment, the circumferential dimensions of the interferences 78a, 78b (refer to FIG. 12) of the press-fitting parts between both circumferential side surfaces of each of both the drive-side engagement protrusions 66b, 66b and both side surfaces of each of both the engagement cutouts 75b, 75b are configured not to change with respect to the radial direction of the drive-side cam 29c. For this reason, it is possible to make the press-fitting stress of the press-fitting parts constant in the radial direction of the drive-side cam 29c (at least, it is possible to make the biasing of the press-fitting stress be within a predetermined range). The other structures and operational effects are similar to the first embodiment.

Fourth Embodiment

Figure 13:
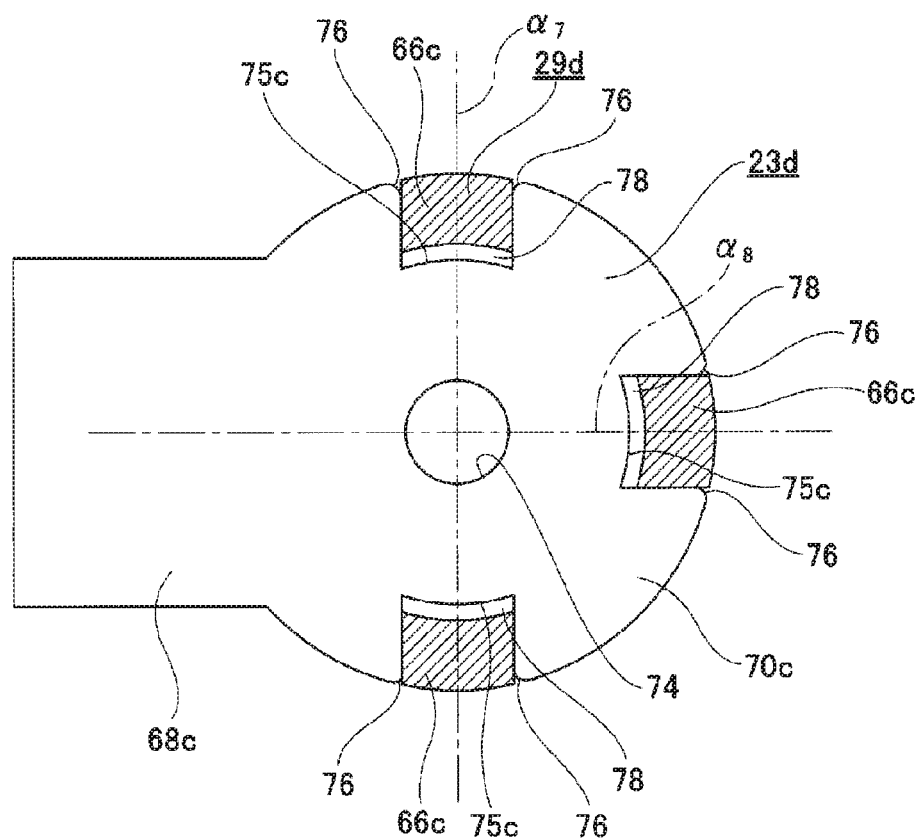
FIG. 13 is a view similar to FIG. 9, depicting a fourth embodiment of the present invention.
Figure 14:
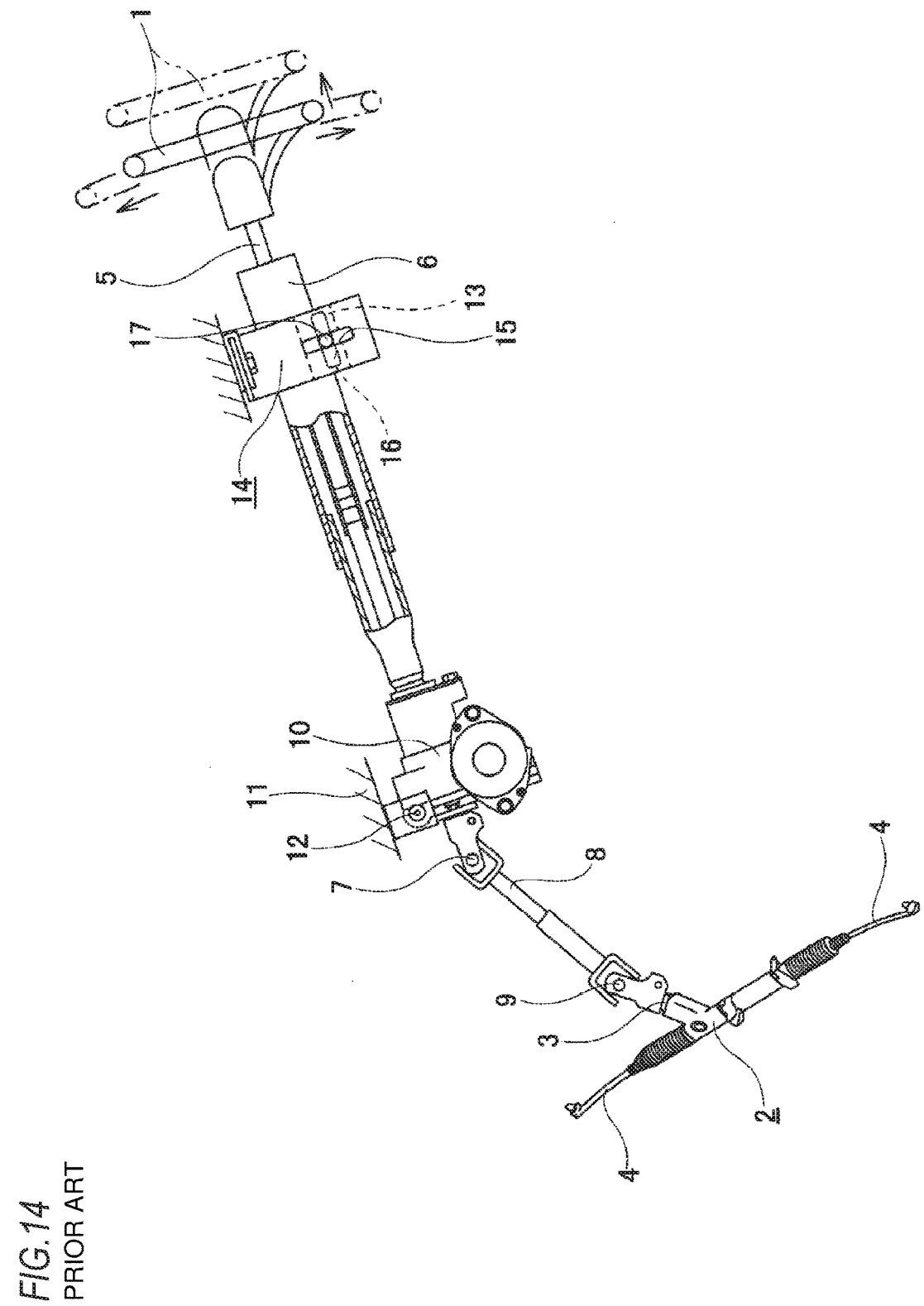
FIG. 14 is a partial side view depicting an example of a steering device to which the present invention is applied.
Figure 15:
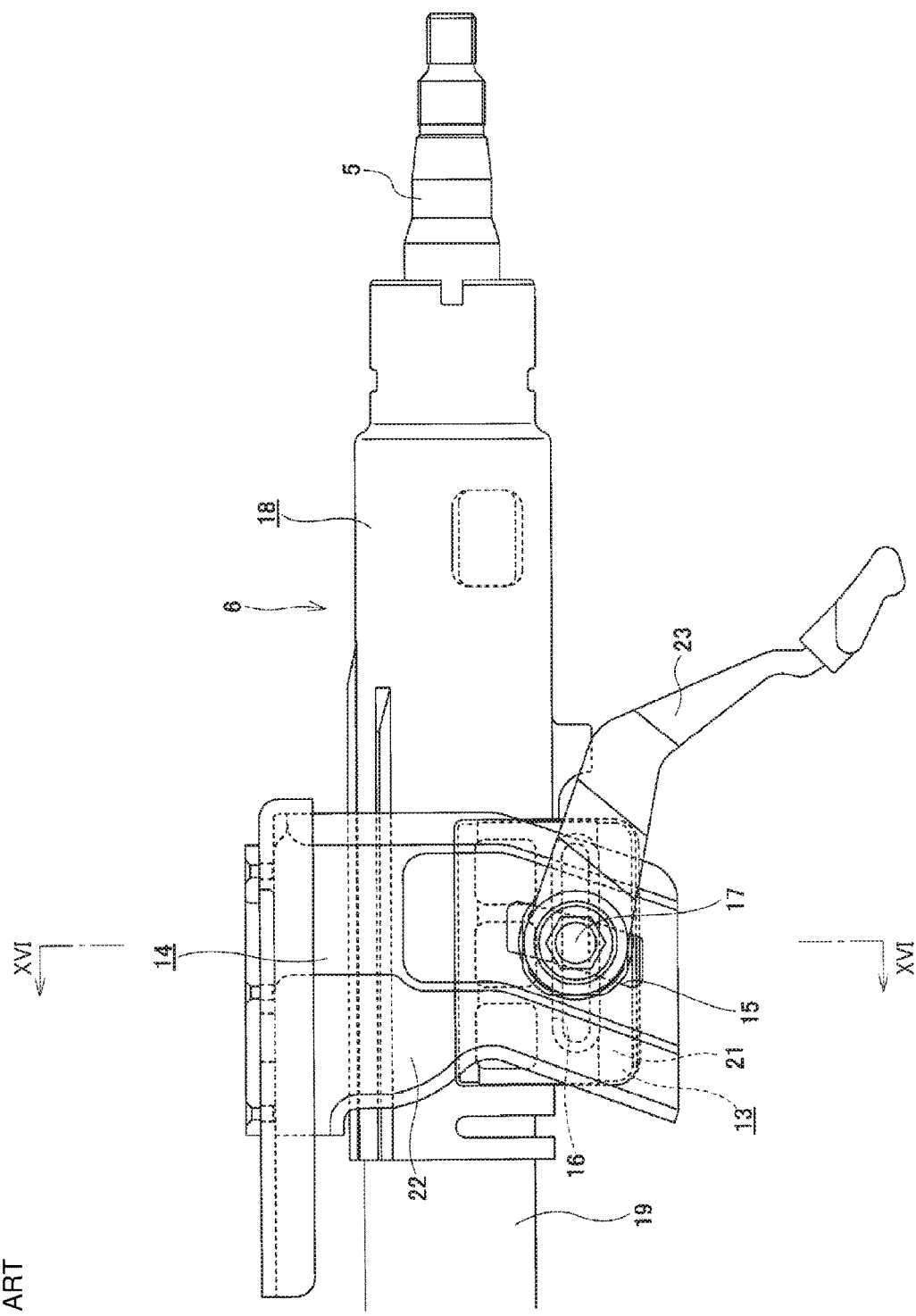
FIG. 15 is a partial side view depicting a specific structure of a position adjustment device for steering wheel.
Figure 16:
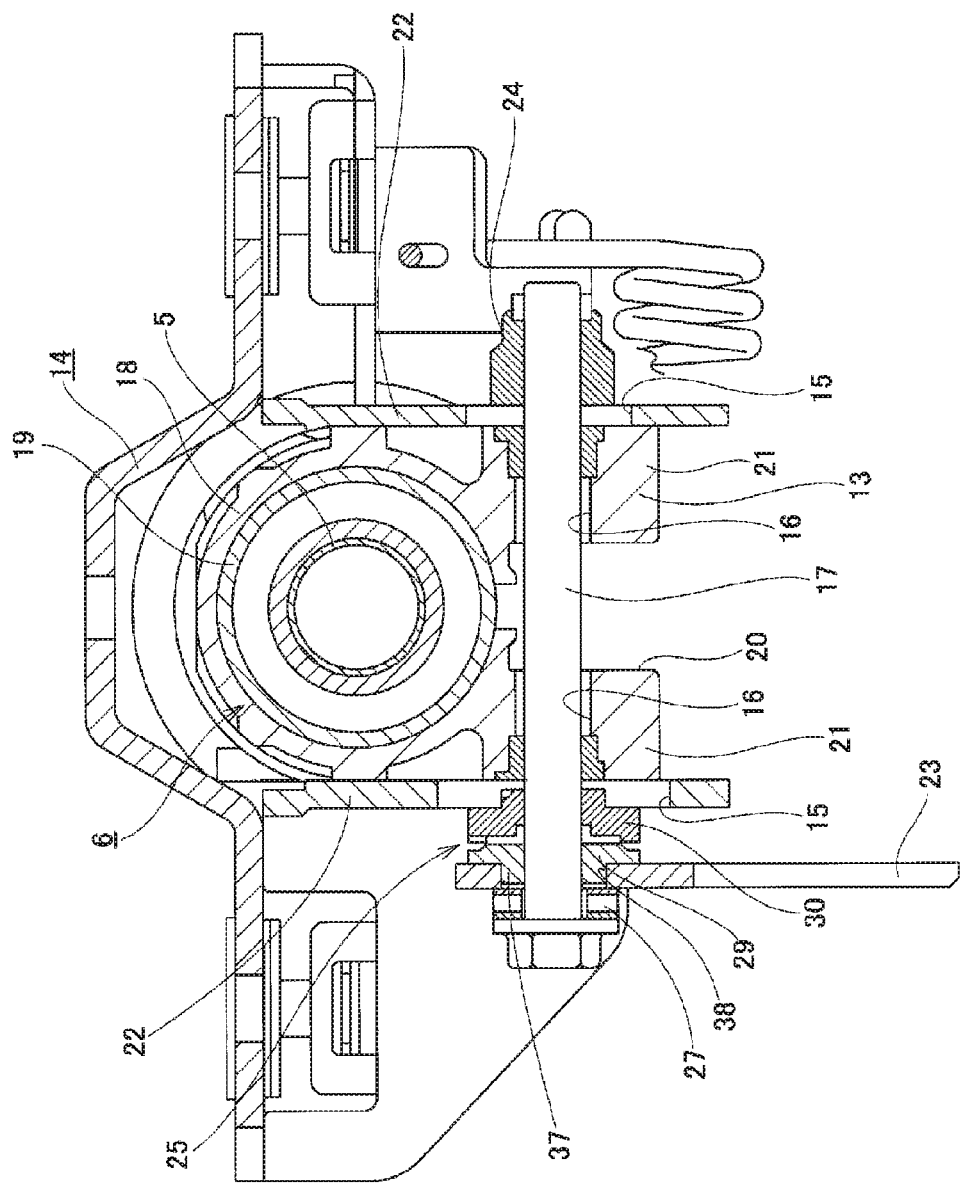
FIG. 16 is a sectional view taken along a line XVI-XVI of FIG. 15.

A fourth embodiment of the present invention is described with reference to FIG. 13. In the fourth embodiment, a drive-side cam 29d configuring the position adjustment device for steering wheel is made of sintered metal, is formed with the center hole 31a (refer to FIG. 7) in which the rod-shaped member 17a (refer to FIG. 4) is to be inserted, and has a substantially circular ring plate shape as a whole, like the first embodiment. Also, an inner surface of the drive-side cam 29d is formed with the drive-side cam surface 33a (refer to FIG. 6), which is a concave-convex surface in the circumferential direction.

Also, in the fourth embodiment, drive-side engagement protrusions 66c, 66c are provided at three circumferential positions of a radially outer end portion of an outer surface of the drive-side cam 29d. Specifically, in the fourth embodiment, the respective drive-side engagement protrusions 66c, 66c are configured by two drive-side engagement protrusions 66c, 66c provided at two positions, which are radially opposite to each other, and one drive-side engagement protrusion 66c provided at a circumferentially central position (a position offset from both the drive-side engagement protrusions 66c, 66c by 90°) between both the drive-side engagement protrusions 66c, 66c. In other words, the three drive-side engagement protrusions 66c, 66c are arranged with circumferential phases being offset by 90°. In the meantime, a configuration where the respective drive-side engagement protrusions 66c, 66c may be arranged with being equidistantly spaced (spaced by 120°) in the circumferential direction, for example, may also be adopted.

Also, both circumferential side surfaces of each of the drive-side engagement protrusions 66c, 66c are formed so that a circumferential distance between both circumferential side surfaces does not change in the radial direction. In other words, both circumferential side surfaces of each of the drive-side engagement protrusions 66c, 66c are provided in parallel with virtual planes $\alpha_7$, $\alpha_8$ including circumferentially central portions of the respective drive-side engagement protrusions 66c, 66c and the central axis of the center hole 31a of the drive-side cam 29d.

Also in the fourth embodiment, an adjustment lever 23d is configured by the lever main body 67 made of synthetic resin and a lever core metal 68c made of metal.

The structure of the lever main body 67 is similar to the first embodiment.

Also, the lever core metal 68c is made by punching a steel plate such as SPCC into a predetermined shape and then bending the same into a substantial L-shape, like the first embodiment, and has the first joining part 69 (refer to FIG. 7) provided at a tip half part and a second joining part 70c provided at a base half part and corresponding to the joining part of the present invention.

The structure of the first joining part 69 is similar to the first embodiment.

In the meantime, the second joining part 70c has a substantially circular plate shape, and is formed at a substantial center position with the fitting hole 74 corresponding to the lever-side fitting hole of the present invention. The inner diameter of the fitting hole 74 is smaller than the outer diameter of the part (the part to which the fitting hole 74 is externally fitted) near one axial end of the rod-shaped member 17a. Also, the same number (three, in the fourth embodiment) of engagement cutouts 75c, 75c as the drive-side engagement protrusions 66c, 66c are formed at three positions with respect to the circumferential direction of the drive-side cam 29d, which are aligned with the respective drive-side engagement protrusions 66c, 66c in the mounted state, of an outer peripheral edge of the second joining part 70c.

Also, both side surfaces (both side surfaces with respect to the circumferential direction of the drive-side cam 29d) of each of the engagement cutouts 75c. 75c are provided in parallel with virtual planes including central portions of the respective engagement cutouts 75c, 75c with respect to the circumferential direction of the drive-side cam 29d and the central axis of the fitting hole 74. Also, a distance between both side surfaces of each of the engagement cutouts 75c, 75c is smaller than a distance between both circumferential side surfaces of both the drive-side engagement protrusions 66c, 66c. Also, a length dimension of both side surfaces of each of the engagement cutouts 75c, 75c with respect to the radial direction of the drive-side cam 29d (a depth of each of the engagement cutouts 75c, 75c) is greater than a radial length dimension of both circumferential side surfaces of each of the drive-side engagement protrusions 66c, 66c.

Also in the fourth embodiment, outer end edges of both side surfaces of each of the engagement cutouts 75c. 75c with respect to the radial direction of the drive-side cam 29d are formed with R portions 76, 76 each of which has a circular arc section. The other structure of the lever core metal 68c is similar to the structure of the lever core metal 68 of the first embodiment.

The adjustment lever 23d configured as described above is mounted to the rod-shaped member 17a in the state where the fitting hole 74 formed in the second joining part 70c of the lever core metal 68c is externally fitted and fixed (press-fitted) to the outer peripheral surface of the part near one axial end of the rod-shaped member 17a by the interference fit. Therefore, when the adjustment lever 23d is caused to swing, the rod-shaped member 17a is rotated integrally with the adjustment lever 23d, in association with the swinging.

Also, in the mounted state as described above, both circumferential side surfaces of each of the drive-side engagement protrusions 66c, 66c are press-fitted between both side surfaces of each of the engagement cutouts 75c, 75c. In the press-fitted state, the radial gap 78 with respect to the radial direction of the drive-side cam 29d exists between an inner peripheral surface of each of the drive-side engagement protrusions 66c, 66c and a bottom surface of each of the engagement cutouts 75c, 75c.

Also in the fourth embodiment, in the mounted state, the outer surface of the drive-side cam 29d and the inner surface of the second joining part 70c of the lever core metal 68c are contacted (closely contacted) each other.

In the fourth embodiment configured as described above, the positioning of the drive-side cam 29d and the lever core metal 68c with respect to the radial direction of the drive-side cam 29d can be made by the engagement (press-fitting) between the respective drive-side engagement protrusions 66c, 66c provided at the three circumferential positions of the radially outer end portion of the drive-side cam 29d and the respective engagement cutouts 75c, 75c. The other structures and operational effects are similar to the first embodiment.

INDUSTRIAL APPLICABILITY

When implementing the present invention, the number, circumferential positions and sectional shapes of the engagement protrusions formed on the outer surface of the drive-side cam (and the engagement cutouts with which the engagement protrusions are to be engaged) are not limited to the respective embodiments.

The subject application is based on Japanese Patent Application No. 2015-197151 filed on Oct. 2, 2015, the entire contents of which are incorporated herein by reference.

DESCRIPTION OF REFERENCE NUMERALS 1, 1a: steering wheel, 2, 2a: steering gear unit, 3, 3a: input shaft, 4, 4a: tie-rod, 5, 5a: steering shaft, 6, 6a: steering column, 7, 7a: universal joint, 8, 8a: intermediate shaft, 9, 9a: universal joint, 10, 10a: housing, 11: vehicle body, 12, 12a: tilt shaft, 13, 13a: displacement bracket, 14, 14a: support bracket, 15, 15a: long hole for tilt, 16, 16a: through-hole, 17, 17a: rod-shaped member, 18, 18a: outer column, 19, 19a: inner column, 20, 20a: slit, 21, 21a: clamped plate part, 22, 22a: support plate part, 23, 23a, 23b, 23c, 23d: adjustment lever, 24, 24a: nut, 25, 25a: cam device, 27, 27a: thrust bearing, 29, 29a, 29b, 29c, 29d: drive-side cam, 30, 30a: driven-side cam, 31, 31a: center hole, 32, 32a: center hole, 33, 33a: drive-side cam surface, 34, 34a: driven-side cam surface, 35, 35a: drive-side reference surface, 36, 36a: drive-side protrusion, 37: drive-side engagement protrusion, 38: through-hole, 39, 39a: driven-side reference surface, 40, 40a: driven-side protrusion, 41: driven-side engagement protrusion, 42, 42a: drive-side guide inclined surface, 43, 43a: driven-side guide inclined surface, 44, 44a: leading end face, 45, 45a: leading end face, 46: electric motor, 47: outer shaft, 48: inner shaft, 49: attachment plate part, 50: separation capsule, 51a, 51b: friction assembly, 52: rectangular pressing plate, 53: head, 54: male screw portion, 56: circular ring friction plate, 57: friction plate for tilt, 58: telescopic friction plate, 59: fixing pin, 60: fixing pin, 61: sleeve, 62: flange portion, 63: collar, 64: coil spring, 65: engagement protrusion, 66, 66a, 66b, 66c: drive-side engagement protrusion, 67: lever main body, 68, 68a, 68b, 68c: lever core metal, 69: first joining part, 70, 70a, 70b, 70c: second joining part, 71: wide portion, 72: narrow portion, 73a, 73b: engagement hole, 74: fitting hole, 75, 75a, 75b, 75c: engagement cutout, 76: R portion, 77: rib, 78: radial gap, 78a, 78b, 78c, 78d: interference.

The invention claimed is:

1. An adjustment lever assembly comprising:
   a rod-shaped member configured to extend over a pair of support plate parts supported to a vehicle body with being spaced in a width direction;
   a cam device provided at a part of the rod-shaped member protruding from an outer surface of one support plate part in the width direction, the cam device comprising a drive-side cam and a driven-side cam, and
   an adjustment lever having a base end portion joined to the drive-side cam,
   wherein the adjustment lever assembly is configured to operate the cam device in association with rotation of the adjustment lever, thereby increasing and decreasing an interval between both the support plate parts in the width direction to thus implement a state where a steering column provided between both the support plate parts is held and a state where the steering column is released from a holding state,
   wherein a metallic lever core metal configuring the base end portion of the adjustment lever has a joining part for joining with the drive-side cam, and the joining part has a lever-side fitting hole penetrating the joining part in the width direction and engagement cutouts formed at outer peripheral edges of a plurality of portions with respect to a circumferential direction of the drive-side cam,
   wherein an outer surface of the drive-side cam in the width direction is formed with a plurality of engagement protrusions at positions that are aligned with the respective engagement cutouts with respect to the circumferential direction of the drive-side cam,
   wherein in a state where both circumferential side surfaces of each of the engagement protrusions are press-fitted to both side surfaces of each of the engagement cutouts with respect to the circumferential direction of the drive-side cam by interference fit, a gap is formed with respect to a radial direction of the drive-side cam between an inner peripheral surface of each of the engagement protrusions with respect to the radial direction of the drive-side cam and a bottom surface of each of the engagement cutouts,
   wherein the lever-side fitting hole of the joining part is externally fitted to an outer peripheral surface of the rod-shaped member by interference fit, and
   wherein the gap with respect to the radial direction of the drive-side cam is greater than a radial gap between an inner peripheral surface of a center hole of the drive-side cam and the outer peripheral surface of the rod-shaped member.

2. The adjustment lever assembly according to claim 1, wherein the respective engagement protrusions are formed at a radially outer end portion of an outer surface of the drive-side cam in the width direction.

3. The adjustment lever assembly according to claim 1, wherein the adjustment lever has a lever main body made of a synthetic resin,
   wherein the lever core metal is made by a metal plate having an L-shape of which a tip half part and a base half part are continuous, and the base half part of the lever core metal is provided with the joining part, and
   wherein the tip half part of the lever core metal is molded to the lever main body.

4. The adjustment lever assembly according to claim 3, wherein a rib is formed on an inner surface of a continuous part between the base half part and the tip half part of the lever core metal.

5. The adjustment lever assembly according to claim 1, wherein both side surfaces of each of the engagement cutouts are provided in parallel with a virtual plane including a central portion of each of the engagement cutouts with respect to the circumferential direction of the drive-side cam and a central axis of the lever-side fitting hole.

6. The adjustment lever assembly according to claim 5, wherein at least one pair of the engagement cutouts is provided at positions that are symmetric with respect to the radial direction of the drive-side cam.

7. The adjustment lever assembly according to claim 5, wherein at least one pair of the engagement cutouts is provided at positions that are not symmetric with respect to the radial direction of the drive-side cam.

8. The adjustment lever assembly according to claim 1, wherein both side surfaces of each of the engagement cutouts are provided in non-parallel with a virtual plane including a central portion of each of the engagement cutouts with respect to the circumferential direction of the drive-side cam and a central axis of the lever-side fitting hole, and
   wherein a distance between both side surfaces of each of the engagement cutouts with respect to the circumferential direction of the drive-side gradually decreases toward an inward side in the radial direction of the drive-side cam.

9. The adjustment lever assembly according to claim 8, wherein both side surfaces of one of both side surfaces of each of the engagement cutouts and both circumferential side surfaces of each of the engagement protrusions are formed in a radial direction about a central axis of the drive-side cam, and both side surfaces of the other are formed in parallel with both side surfaces of the one, in a free state.

10. The adjustment lever assembly according to claim 1, wherein at least a portion, to which each of the engagement cutouts is contacted, around each of the drive-side engagement protrusions is formed with a concave portion.

11. The adjustment lever assembly according to claim 1, wherein the lever core metal is punched from an inner surface of the joining part, which is a surface facing toward the drive-side cam in a mounted state, toward an outer surface, which is a surface opposite to the drive-side cam in the mounted state, and
   wherein a portion in a vicinity of the lever-side fitting hole on an outer side of the joining part, which is opposite to the drive-side cam in the mounted state, is subjected to surface pressing.

12. A position adjustment device for a steering wheel comprising:
   a cylindrical steering column configured to be supported to a vehicle body;

a displacement bracket provided at an axially intermediate part of the steering column;

a support bracket comprising an attachment plate part provided at an upper part thereof and a pair of support plate parts hanging down from the attachment plate part, and configured to be supported to the vehicle body by the attachment plate part with the displacement bracket being clamped by both the support plate parts from both sides in a width direction;

a pair of vehicle body-side through-holes formed at portions of the pair of support plate parts aligned with each other;

a displacement-side through-hole formed to penetrate in the width direction a portion of the displacement bracket, which is aligned with at least portions of both the vehicle body-side through-holes;

a rod-shaped member inserted into the pair of vehicle body-side through-holes and the displacement-side through-hole in the width direction;

a pressing part provided at a part, which is one end portion of the rod-shaped member and protrudes from an outer surface of one support plate part of both the support plate parts;

an anchor part provided at a part, which is the other end portion of the rod-shaped member and protrudes from an outer surface of the other support plate part of both the support plate parts;

a cam device comprising a driven-side cam, which is externally fitted to be axially displaceable relative to the rod-shaped member to the part of the rod-shaped member protruding from the outer surface of one support plate part in the width direction and has a driven-side cam surface formed on an outer surface in the width direction, and a drive-side cam, which is externally fitted to the rod-shaped member at a more outward side than the driven-side cam in the width direction and has a drive-side cam surface formed on an inner surface in the width direction and engaged with the driven-side cam surface, the cam device being configured to increase and decrease an interval between the pressing part and the anchor part in the width direction, and an adjustment lever having a base end portion joined to the drive-side cam, wherein the base end portion of the adjustment lever is provided with a joining part for joining with the drive-side cam, wherein the joining part has a lever-side fitting hole penetrating the joining part in the width direction and engagement cutouts formed at outer peripheral edges of a plurality of portions with respect to a circumferential direction of the drive-side cam, wherein an outer surface of the drive-side cam in the width direction is formed with a plurality of engagement protrusions at positions that are aligned with the respective engagement cutouts with respect to the circumferential direction of the drive-side cam, wherein in a state where both circumferential side surfaces of each of the engagement protrusions are press-fitted to both side surfaces of each of the engagement cutouts with respect to the circumferential direction of the drive-side cam by interference fit, a gap is formed with respect to a radial direction of the drive-side cam between an inner peripheral surface of each of the engagement protrusions with respect to the radial direction of the drive-side cam and a bottom surface of each of the engagement cutouts, wherein the lever-side fitting hole of the joining part is externally fitted to an outer peripheral surface of the rod-shaped member by interference fit, and wherein the gap with respect to the radial direction of the drive-side cam is greater than a radial gap between an inner peripheral surface of a center hole of the drive-side cam and the outer peripheral surface of the rod-shaped member.

13. The position adjustment device for according to claim 12, wherein at least a portion, to which each of the engagement cutouts is contacted, around each of the drive-side engagement protrusions is formed with a concave portion.

14. The position adjustment device according to claim 12, wherein a metallic lever core metal configuring the base end portion of the adjustment lever is punched from an inner surface of the joining part, which is a surface facing toward the drive-side cam in a mounted state, toward an outer surface, which is a surface opposite to the drive-side cam in the mounted state, and wherein a portion in a vicinity of the lever-side fitting hole on an outer side of the joining part, which is opposite to the drive-side cam in the mounted state, is subjected to surface pressing.

* * * * *